US012069244B2

(12) United States Patent
Huang et al.

(10) Patent No.: US 12,069,244 B2
(45) Date of Patent: Aug. 20, 2024

(54) DECODER SIDE MOTION DERIVATION USING SPATIAL CORRELATION

(71) Applicant: QUALCOMM Incorporated, San Diego, CA (US)

(72) Inventors: Han Huang, San Diego, CA (US); Vadim Seregin, San Diego, CA (US); Chun-Chi Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/932,595

(22) Filed: Sep. 15, 2022

(65) Prior Publication Data

US 2023/0117308 A1     Apr. 20, 2023

Related U.S. Application Data

(60) Provisional application No. 63/250,777, filed on Sep. 30, 2021.

(51) Int. Cl.
*H04N 19/105*   (2014.01)
*H04N 19/132*   (2014.01)
(Continued)

(52) U.S. Cl.
CPC ......... *H04N 19/105* (2014.11); *H04N 19/132* (2014.11); *H04N 19/137* (2014.11); *H04N 19/176* (2014.11)

(58) Field of Classification Search
None
See application file for complete search history.

(56) References Cited

U.S. PATENT DOCUMENTS

2021/0084329 A1*   3/2021   Venugopal ........... H04N 19/172

FOREIGN PATENT DOCUMENTS

WO      2018002021 A1    1/2018
WO      2018175911        9/2018

OTHER PUBLICATIONS

Chang Y-J., et al., "Compression Efficiency Methods Beyond VVC", 21. JVET Meeting, Jan. 6, 2021-Jan. 15, 2021, by teleconference, (The Joint Video Exploration Team of ISO/IEC JTC1/SC29/WG11 and ITU-T SG.16), No. JVET-U0100, Dec. 31, 2020, pp. 1-13, XP030293237.

(Continued)

*Primary Examiner* — Christopher G Findley
(74) *Attorney, Agent, or Firm* — Shumaker & Sieffert, PA

(57) ABSTRACT

A method of decoding video data includes determining a plurality of hypotheses of a current block based on a plurality of motion vectors. Each of the plurality of motion vectors is associated with one of the plurality of hypotheses, and each of the plurality of hypotheses is based on a set of samples in a reference picture having a motion vector that identifies a top-left sample of the set of samples. The method includes determining one or more neighboring samples in the same picture as the current block, for each of the plurality of hypotheses, determining respective correlation values between at least one sample of a respective hypothesis and at least one sample of the one or more neighboring samples, determining the motion vector for the current block based on the determined respective correlation values, and reconstructing the current block based on the determined motion vector.

22 Claims, 16 Drawing Sheets

(51) Int. Cl.
  *H04N 19/137* (2014.01)
  *H04N 19/176* (2014.01)

(56) References Cited

OTHER PUBLICATIONS

Chen Y., et al., "Description of SDR, HDR and 360° Video Coding Technology Proposal by Qualcomm and Technicolor—Low and High Complexity Versions", JVET-J0021, Joint Video Exploration Team (JVET) of ITU-T SG 16 WP 3 and ISO/IEC JTC 1/SC 29/WG 11, 10th Meeting: San Diego, US, Apr. 10-20, 2018, pp. 1-42.

Chen Y., et al., "Description of SDR, HDR and 360° Video Coding Technology Proposal by Qualcomm and Technicolor—Low and High Complexity Versions", 10 JVET Meeting, Apr. 10, 2018-Apr. 20, 2018, San Diego, The Joint Video Exploration Team of ISO/IEC JTC1/SC29/WG11 and ITU-TSG.16 WP 3, No. JVET-J0021 v2, Apr. 6, 2018, 43 Pages, XP030248085.

Chien W-J., et al., "Hybrid Video Codec Based on Flexible Block Partitioning With Extensions to the Joint Exploration Model", IEEE Transactions on Circuits and Systems for Video Technology, IEEE, USA, vol. 30, No. 5, Nov. 28, 2019, pp. 1346-1360, XP011786802, ISSN: 1051-8215, 15 Pages, Section II.C.3.

Coban M., et al., "Algorithm Description of Enhanced Compression Model 2 (ECM 2)", 23rd, MPEG Meeting, Jul. 7, 2021-Jul. 16, 2021, Online, (Motion Picture Expert Group or ISO/IEC JTC1/SC29/WG11), No. M57745, JVET-W2025, Sep. 1, 2021, XP030297803, pp. 1-22.

He Y., et al., "CE4-Related: Encoder Speed Up and Bug Fix for Generalized Bi-Prediction in BMS-2.1", JVET-L0296, Joint Video Experts Team (JVET) of ITU-T SG 16 WP 3 and ISO/IEC JTC 1/SC 29/WG 11, 12th Meeting: Macao, CN, Oct. 3-12, 2018, pp. 1-5.

Huang H., et al., "Non-EE2: Decoder Side Motion Derivation Using Sample's Spatial Correlation", JVET-X0146-V2, Joint Video Experts Team (JVET) of ITU-T SG 16 WP 3 and ISO/IEC JTC 1/SC 29, 24th Meeting, by teleconference, Oct. 6-15, 2021, pp. 1-3.

Huang (Qualcomm) H., et al., "Non-EE2: Decoder Side Motion Derivation Using Sample's Spatial Correlation", 136. MPEG Meeting, Oct. 11, 2021-Oct. 15, 2011, Online, Motion Picture Expert Group or ISO/IEC JTC1/SC29/WG11, ITU-TSG 16 WP 3, No. m57947, JVET-X0146, Sep. 30, 2021, 3 Pages, XP030297743.

International Search Report and Written Opinion—PCT/US2022/043845—ISA/EPO—Dec. 14, 2022 (14 pp).

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

Su Y-C., et al., "CE4-related: Generalized Bi-prediction Improvements Combined from JVET-L0197 and JVET-L0296", Joint Video Experts Team (JVET) of ITU-T SG 16 WP 3 and ISO/IEC JTC 1/SC 29/WG 11, 12th Meeting: Macao, CN, Oct. 3-12, 2018, Document: JVET-L0646-v5, pp. 1-6.

Su Y-C., et al, "CE4-Related: Generalized bi-prediction Improvements", Joint Video Experts Team (JVET) of ITU-T SG 16 WP 3 and ISO/IEC JTC 1/SC 29/WG 11, 12th Meeting: Macao, CN, Oct. 3-12, 2018, Document: JVET-L0197-4, pp. 1-3.

* cited by examiner

Alternative Template matching

Anchor: TM tools off      Test: TM merge on and replace TM cost by Laplacian cost

*Use two prediction samples and one recon. sample*

|  | Random access Main10 Over ECM-2.0 | | | | |
|---|---|---|---|---|---|
|  | Y | U | V | EncT | DecT |
| Class B | -0.97% | -1.24% | -1.13% | 107% | 101% |
| Class C | -0.94% | -1.32% | -1.34% | 106% | 102% |
| Class E |  |  |  |  |  |
| Class D | -0.78% | -0.84% | -0.98% | 107% | 103% |

Anchor: ECM base encoder      Test: TM merge on and replace TM cost by Laplacian cost

| Class B | -0.99% | -1.19% | -1.33% | 107% | 104% |
|---|---|---|---|---|---|
| Class C | -0.81% | -1.18% | -1.24% | 110% | 106% |
| Class E |  |  |  |  |  |
| Class D | -0.61% | -1.02% | -1.00% | 109% | 105% |

FIG. 15

Alternative Template matching
Signal a flag to differentiate TM cost and Laplacian cost

| | Random access Main10 | | | | |
|---|---|---|---|---|---|
| | Over ECM-2.0 base encoder | | | | |
| | Y | U | V | EncT | DecT |
| Class B | -1.80% | -1.91% | -1.95% | 116% | 112% |
| Class C | -1.74% | -1.93% | -2.10% | 119% | 121% |
| Class E | | | | | |
| Class D | -1.61% | -1.65% | -1.73% | 120% | 132% |

TM merge gain on ECM base encoder

| | Random access Main10 | | | | |
|---|---|---|---|---|---|
| | Over ECM-2.0 base encoder | | | | |
| | Y | U | V | EncT | DecT |
| Class B | -1.70% | -1.75% | -1.89% | 107% | 109% |
| Class C | -1.64% | -1.59% | -1.96% | 109% | 113% |
| Class E | | | | | |
| Class D | -1.55% | -1.45% | -1.41% | 110% | 119% |

Upper bound test

| | Random access Main10 | | | | |
|---|---|---|---|---|---|
| | Over ECM-2.0 base encoder | | | | |
| | Y | U | V | EncT | DecT |
| Class B | -2.61% | -2.75% | -2.80% | 114% | 2% |
| Class C | -2.50% | -3.71% | -2.98% | 118% | 3% |
| Class E | | | | | |
| Class D | -2.25% | -2.35% | -2.42% | 117% | 5% |

FIG. 16

DECODER SIDE MOTION DERIVATION USING SPATIAL CORRELATION

This application claims the benefit of U.S. Provisional Application No. 63/250,777, filed Sep. 30, 2021, the entire content of which is incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for inter-prediction in video codecs, such as decoder side motion vector derivation. In one or more examples, the decoder side motion vector derivation techniques include using a spatial correlation of a sample. Although the example techniques are described as being related to decoder side motion vector derivation, a video encoder and/or video decoder may perform the example techniques. For instance, a video encoder may include a decoding loop, and the video encoder may perform example techniques described in this disclosure as part of the decoding loop.

Spatial correlation may refer to a correlation value indicative of a correlation between one or more neighboring samples of a current block and a hypothesis of a current block, where the hypothesis of the current block is based on a motion vector. The video decoder may determine a plurality of hypotheses of the current block, each associated with a respective motion vector, and determine respective correlation values between one or more neighboring samples of the current block and respective hypothesis of the current block. Based on the respective correlation values, the video decoder may determine a motion vector for the current block, and use the determined motion vector for reconstructing the current block.

By utilizing spatial correlation between neighboring samples of the current block and respective hypotheses of the current block to determine a motion vector, the example techniques may result in selection of a prediction block that tends to be a better predictor of the current block. For instance, the residual between the prediction block and the current block may be relatively low, utilizing the example techniques described in this disclosure. Accordingly, the amount of information needed to signal the residual may be relatively low, resulting in reduced bandwidth utilization.

In one example, the disclosure describes a device for decoding video data, the device comprising: memory configured to store the video data; and processing circuitry coupled to the memory and configured to: determine a plurality of hypotheses of a current block of the video data based on a plurality of motion vectors, wherein each of the plurality of motion vectors is associated with one of the plurality of hypotheses of the current block, wherein each of the plurality of hypotheses of the current block is based on a set of samples in a reference picture for determining a motion vector for the current block, and respective motion vectors associated with respective hypotheses of the current block identify a top-left sample of the set of samples; determine one or more neighboring samples that are proximate to samples of the current block and in the same picture as the current block; for each of the plurality of hypotheses of the current block, determine respective correlation values between at least one sample of a respective hypothesis of the current block and at least one sample of the one or more neighboring samples; determine the motion vector for the current block based on the determined respective correlation values; and reconstruct the current block based on the determined motion vector.

In one example, the disclosure describes a method of decoding video data, the method comprising: determining a plurality of hypotheses of a current block of the video data based on a plurality of motion vectors, wherein each of the plurality of motion vectors is associated with one of the plurality of hypotheses of the current block, wherein each of the plurality of hypotheses of the current block is based on a set of samples in a reference picture for determining a motion vector for the current block, and respective motion vectors associated with respective hypotheses of the current block identify a top-left sample of the set of samples; determining one or more neighboring samples that are proximate to samples of the current block and in the same picture as the current block; for each of the plurality of hypotheses of the current block, determining respective correlation values between at least one sample of a respective hypothesis of the current block and at least one sample of the one or more neighboring samples; determining the motion vector for the current block based on the determined respective correlation values; and reconstructing the current block based on the determined motion vector.

In one example, the disclosure describes a computer-readable storage medium storing instructions thereon that when executed cause one or more processors to: determine a plurality of hypotheses of a current block of video data based on a plurality of motion vectors, wherein each of the plurality of motion vectors is associated with one of the plurality of hypotheses of the current block, wherein each of the plurality of hypotheses of the current block is based on a set of samples in a reference picture for determining a motion vector for the current block, and respective motion vectors associated with respective hypotheses of the current block identify a top-left sample of the set of samples; determine one or more neighboring samples that are proximate to samples of the current block and in the same picture as the current block; for each of the plurality of hypotheses of the current block, determine respective correlation values between at least one sample of a respective hypothesis of the current block and at least one sample of the one or more neighboring samples; determine the motion vector for the current block based on the determined respective correlation values; and reconstruct the current block based on the determined motion vector.

In one example, the disclosure describes a device for decoding video data, the device comprising: means for determining a plurality of hypotheses of a current block of the video data based on a plurality of motion vectors, wherein each of the plurality of motion vectors is associated with one of the plurality of hypotheses of the current block, wherein each of the plurality of hypotheses of the current block is based on a set of samples in a reference picture for determining a motion vector for the current block, and respective motion vectors associated with respective hypotheses of the current block identify a top-left sample of the set of samples; means for determining one or more neighboring samples that are proximate to samples of the current block and in the same picture as the current block; for each of the plurality of hypotheses of the current block, means for determining respective correlation values between at least one sample of a respective hypothesis of the current block and at least one sample of the one or more neighboring samples; means for determining the motion vector for the current block based on the determined respective correlation values; and means for reconstructing the current block based on the determined motion vector.

The details of one or more examples are set forth in the accompanying drawings and the description below. Other features, objects, and advantages will be apparent from the description, drawings, and claims.

BRIEF DESCRIPTION OF DRAWINGS

FIG. 15 illustrates a first set of Tables showing results of one or more example techniques described in this disclosure for alternative template matching.

FIG. 16 illustrates a second set of Tables showing results of one or more example techniques described in this disclosure for alternative template matching.

DETAILED DESCRIPTION

Figure 1:
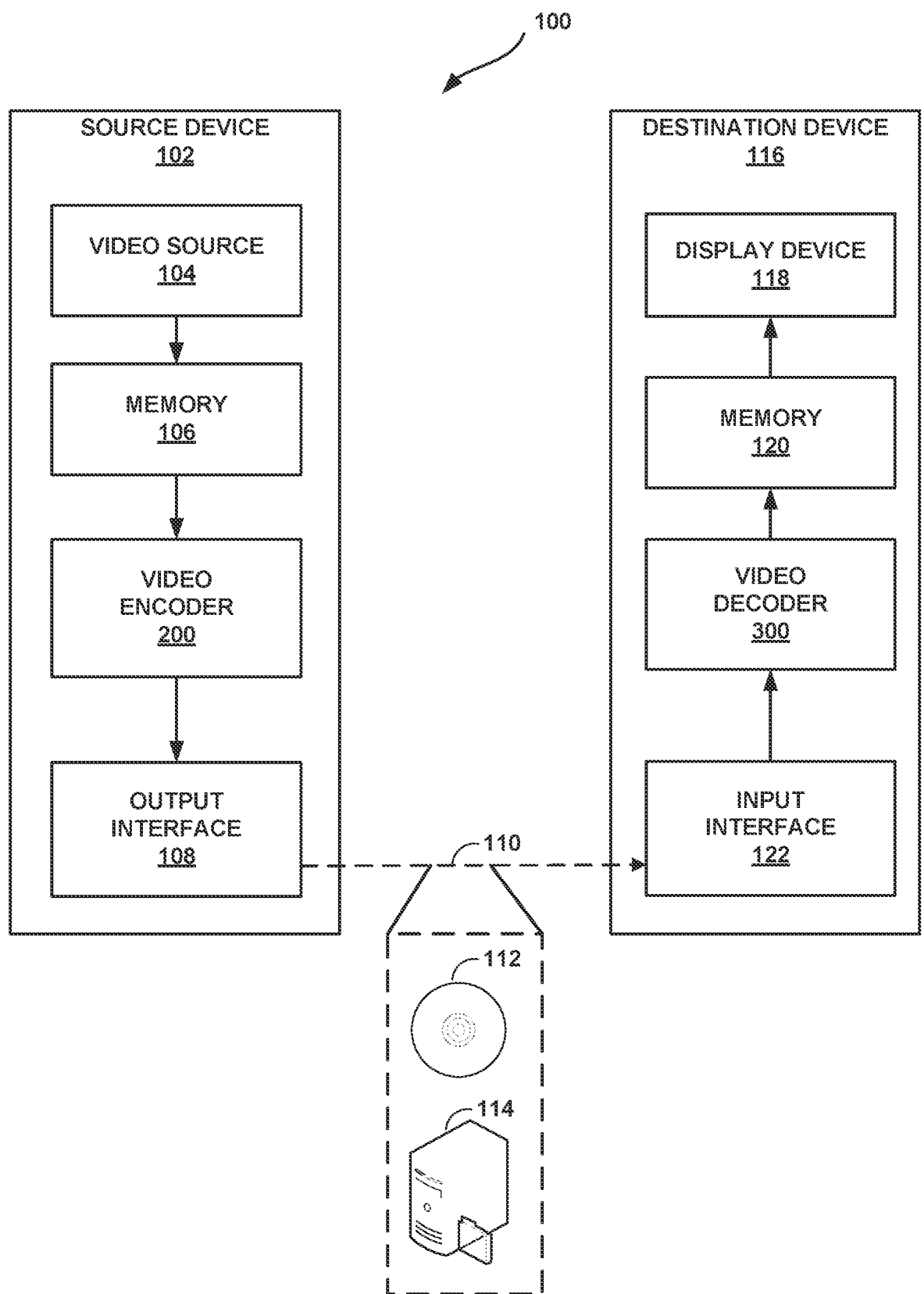
FIG. 1 is a block diagram illustrating an example video encoding and decoding system that may perform the techniques of this disclosure.

This disclosure describes example techniques related to decoder side motion vector prediction. In decoder side motion vector prediction, a video decoder may be configured to refine a motion vector. This disclosure describes example techniques of a decoder side motion derivation that uses spatial correlation of a sample. For example, a video decoder may determine a plurality of hypotheses of a current block based on an associated motion vector. A hypothesis of the current block refers to a set of samples that are used to determine a motion vector for the current block. For instance, each of the plurality of hypotheses of the current block is based on a set of samples in a reference picture for determining a motion vector for the current block, and respective motion vectors associated with respective hypotheses of the current block identify a top-left sample of the set of samples.

As an example, an initial motion vector for the current block may define a search area. The initial motion vector may identify the center of the search area, and the search area may form a square having a width and height of 16 samples. Within this search area, the video decoder may determine a plurality of motion vectors, and each of the plurality of motion vectors may identify a block of samples. The block of samples identified by a motion vector is one example of a hypothesis of the current block. Another example of a hypothesis of the current block is the block of samples added to residual values decoded by the video decoder. In general, a hypothesis of the current block is based on a set of samples in a reference picture, and the motion vector associated with the hypothesis of the current block identifies a top-left sample of the set of samples.

Accordingly, each hypothesis of the current block is associated with a respective one of a plurality of motion vectors, and is used for determining a motion vector for the current block. A hypothesis of a current block and a motion vector associated with the hypothesis of the current block should not be confused with a prediction block and a motion vector for that prediction block. In this disclosure, a video decoder uses each of the hypotheses of the current block to determine a motion vector for the current block. Once the video decoder determines the motion vector for the current block, the video decoder may determine a prediction block based on the determined motion vector. It is possible that one of the hypotheses of the current block is eventually determined to be the prediction block. However, initially, the hypotheses of the current block exist for determining the motion vector.

In accordance with one or more examples described in this disclosure, a video decoder may determine a correlation value (also referred to as a "cost") between each of the plurality of hypotheses of the current block and a current template. The current template includes one or more neighboring samples to the current block (e.g., samples in the row above the current block and the next row above the current block, and samples in the column left of the current block and the next left column to left column of the current block). The video decoder may determine respective correlation values between at least one sample in each of the hypotheses of the current block and at least one of the samples of the one or more neighboring samples.

The video decoder may compare to the correlation values to identify the hypothesis of the current block having the highest correlation with the one or more neighboring samples (e.g., having the lowest cost). The video decoder may determine the motion vector associated with the identified hypothesis of the current block (e.g., the motion vector that identified the block of samples that formed the hypothesis of the current block having the highest correlation with the one or more neighboring samples). The video decoder may use the determined motion vector to identify a prediction block for the current block.

In some examples, the video decoder may rank the respective motion vectors based on the correlation value (e.g., cost) of hypotheses of the current block associated with the respective motion vectors. For instance, motion vector A may be associated with a first hypothesis of the current block, and motion vector B may be associated with a second hypothesis of the current block. Assume that a correlation value for the second hypothesis of the current block indicates that the second hypothesis of the current block is more correlated (e.g., there is less difference) to one or more neighboring samples than the first hypothesis of the current block. In this example, the video decoder may rank motion vector B as the more likely motion vector over motion vector A. The video decoder may construct a list of motion vectors with more likely motion vectors (e.g., motion vector B) being identified with smaller indices than less likely motion vectors (e.g., motion vector A). The video decoder may receive information indicative of an index into the list of motion vectors to determine the motion vector for the current block.

In this way, the video decoder may utilize spatial correlation between hypotheses of the current block and one or more neighboring samples of the current block to determine a motion vector for the current block. The spatial correlation may be a value indicative of how correlated each of the hypotheses of the current block is to the one or more neighboring samples. As one example, the spatial correlation may be represented as a correlation value (also referred to as a cost). The correlation value (e.g., cost) may be an Nth-order derivative between at least one sample of the respective hypotheses of the current block and at least one of the one or more neighboring samples. For example, Nth-order derivative may be a second order derivative, and referred to as a Laplacian indicative of a gradient between at least one sample of the respective hypotheses of the current block and at least one of the one or more neighboring samples.

Using spatial correlation for determining a motion vector may provide advantages. For instance, some techniques utilize similarity/distortion between target samples and reference samples for decoder side motion derivation. The target samples may include one or more neighboring samples and reference samples may include one or more samples in a reference picture. The reference samples may be identified by a motion vector, but the motion vector does not identify a top-left sample of reference samples.

However, such techniques may not account for spatial correlation of a sample. The spatial correlation may include the correlation of one or more neighboring samples to a current block and samples in a hypothesis of the current block. By accounting of spatial correlation, the example techniques may provide better refinement for the motion vectors, resulting in generating a prediction block with samples that are closer in value to the samples of a current block. By having a prediction block with samples that are closer in value to the samples of a current block, a residual between the prediction block and current block may be smaller, resulting in a reduction in the amount of data that is signaled.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for decoder side motion derivation using spatial correlation of a sample. Although the example techniques are described as being related to decoder side motion vector derivation, video encoder 200 and/or video decoder 300 may perform the example techniques. For instance, video encoder 200 may include a decoding loop, and video encoder 200 may perform example techniques described in this disclosure as part of the decoding loop. Hence, the term "decoder side" should not be interpreted as being limited to video decoder 300.

Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for decoder side motion derivation using spatial correlation of a sample. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that use decoder side motion vector derivation. For instance, the example techniques may utilize spatial correlation (e.g., correlation of between a sample of a current block and samples in the same picture) as part of the decoder side motion vector derivation, rather than or in addition to using similarity/distortion between target samples and reference samples.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

In accordance with the techniques of this disclosure, and as described in more detail, video encoder 200 and/or video decoder 300 (e.g., a video coder) may be configured to perform decoder side motion vector derivation. As one example, a video coder may determine a spatial correlation of a sample of a current block (e.g., correlation between samples in the same picture as the sample of the current block), determine one or more motion vectors based on a decoder side motion vector derivation that utilizes the spatial correlation, and code (e.g., encode or decode) the current block based on the one or more motion vectors. For example, for decoding, video decoder 300 may determine a prediction block based on the one or more motion vectors, receive information indicative of a difference (e.g., residual) between the prediction block and the current block, and sum the difference and the prediction block to reconstruct the current block.

The example techniques may also be used in various other examples (e.g., in addition to or instead of decoder side motion vector derivation). For example, the example techniques of using spatial correlation for motion vector list predictor reordering or determining context for coding a sign for a motion vector difference, as described in more detail. For instance, video encoder 200 and/or video decoder 300 may determine one or more correlation values (e.g., costs) of motion vectors based on spatial correlation of a sample of a current block. The spatial correlation may be based on at least one sample from a hypothesis of a current block and at least one sample from a neighboring block. Video encoder 200 and/or video decoder 300 may reorder a list of motion vector predictors based on the determined one or more costs, and code the current block based on the reordered list. As another example, video encoder 200 and/or video decoder 300 may context-based code a sign for a motion vector difference based on the determined one or more costs.

Prior to describing example techniques noted above for decoder side motion vector derivation, motion vector list predictor reordering, or contexts for a sign for a motion vector difference, the following describes examples of various coding techniques.

The following describes inter prediction in the VVC standard. For each inter-predicted CU in Versatile Video Coding standard (VVC), motion parameters consisting of motion vectors, reference picture indices and reference picture list usage index, and additional information needed for the new coding feature of VVC to be used for inter-predicted sample generation. The motion parameter can be signalled in an explicit or implicit manner. When a CU is coded with skip mode, the CU is associated with one PU and has no significant residual coefficients, no coded motion vector delta or reference picture index. A merge mode is specified whereby the motion parameters for the current CU are obtained from neighbouring CUs, including spatial and temporal candidates, and additional schedules introduced in VVC. The merge mode can be applied to any inter-predicted CU, not only for skip mode. The alternative to merge mode is the explicit transmission of motion parameters, where motion vector, corresponding reference picture index for each reference picture list and reference picture list usage flag and other needed information are signalled explicitly per each CU.

Beyond the inter coding features in HEVC, VVC includes a number of new and refined inter prediction coding tools listed as follows: Extended merge prediction, Merge mode with MVD (MMVD), Symmetric MVD (SMVD) signalling, Affine motion compensated prediction, Subblock-based temporal motion vector prediction (SbTMVP), Adaptive motion vector resolution (AMVR), Motion field storage: $1/16^{th}$ luma sample MV storage and 8×8 motion field compression, Bi-prediction with CU-level weight (BCW), Bi-directional optical flow (BDOF), Decoder side motion vector refinement (DMVR), Geometric partitioning mode (GPM), and Combined inter and intra prediction (CIIP).

The following describes extended merge prediction. In VVC with regular merge mode, the merge candidate list is constructed by including the following five types of candidates in order: 1) Spatial MVP from spatial neighbour CUs, 2) Temporal MVP from collocated CUs, 3) History-based MVP from an FIFO table, 4) Pairwise average MVP, and 5) Zero MVs.

The size of merge list is signalled in sequence parameter set header and the maximum allowed size of merge list is 6. For each CU code in merge mode, an index of best merge candidate is encoded using truncated unary binarization (TU).

The derivation process of each category of merge candidates is described as follows. Similar to HEVC, VVC also supports parallel derivation of the merging candidate lists for all CUs within a certain size of area.

Figure 6:
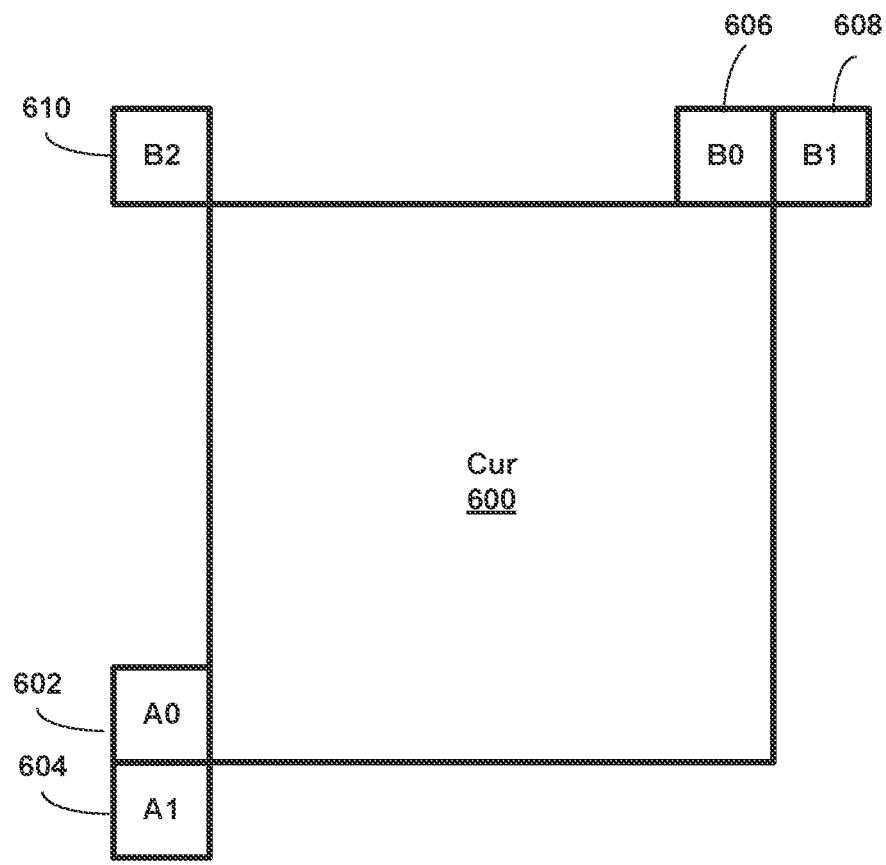
FIG. 6 is a conceptual diagram illustrating an example of position of spatial merge candidate.

The following describes spatial candidate derivation. The derivation of spatial merge candidates in VVC may be same as that in HEVC except the positions of first two merge candidates are swapped. A maximum of four merge candidates are selected among candidates located in the positions depicted for block 600 in FIG. 6. The order of derivation is block 606 (position $B_0$), block 602 (position $A_0$), block 608 (position $B_1$) block 604 (position $A_1$) and block 610 (position $B_2$). Position $B_2$ is considered only when one or more than one CUs of position $B_0$, $A_0$, $B_1$, $A_1$ are not available (e.g., because it belongs to another slice or tile) or is intra coded. After candidate at position $A_1$ is added, the addition of the remaining candidates is subject to a redundancy check which ensures that candidates with same motion information are excluded from the list so that coding efficiency is improved.

The following describes temporal candidate derivation. In this step, only one candidate may be added to the list. In the derivation of this temporal merge candidate, a scaled motion vector is derived based on co-located CU 702 for current CU

Figure 7:
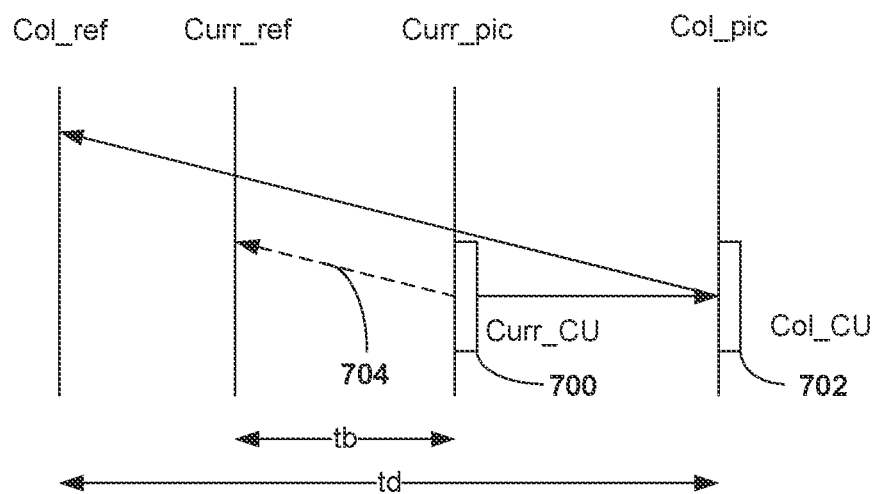
FIG. 7 is a conceptual diagram illustrating an example of motion vector scaling for temporal merge candidate.

700 belonging to the collocated reference picture. The reference picture list to be used for derivation of the co-located CU is explicitly signaled in the slice header. The scaled motion vector 704 for temporal merge candidate is obtained as illustrated by the dotted line in FIG. 7, which is scaled from the motion vector of the co-located CU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero.

Figure 8:
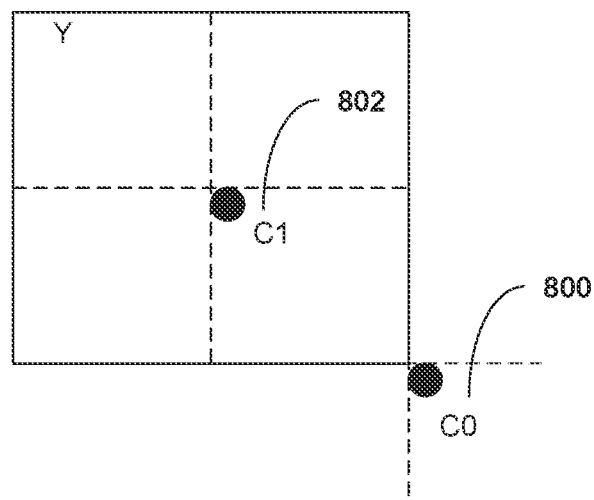
FIG. 8 is a conceptual diagram illustrating an example of candidate positions for temporal merge candidate.

The position for the temporal candidate is selected between candidates 800 ($C_0$) and 802 ($C_1$), as depicted in FIG. 8. If CU at position $C_0$ is not available, is intra coded, or is outside of the current row of CTUs, position $C_1$ is used. Otherwise, position $C_0$ is used in the derivation of the temporal merge candidate.

The following describes history-based merge candidate derivation. The history-based motion vector predictor (HMVP) merge candidates are added to merge list after the spatial MVP and TMVP. In one or more examples, the motion information of a previously coded block is stored in a table and used as MVP (motion vector predictor) for the current CU. The table with multiple HMVP candidates is maintained during the encoding/decoding process. The table is reset (emptied) when a new CTU row is encountered. Whenever there is a non-subblock inter-coded CU, the associated motion information is added to the last entry of the table as a new HMVP candidate.

The HMVP table size S is set to be 6, which indicates up to 6 History-based MVP (HMVP) candidates may be added to the table. When inserting a new motion candidate to the table, a constrained first-in-first-out (FIFO) rule is utilized wherein redundancy check is firstly applied to find whether there is an identical HMVP in the table. If found, the identical HMVP is removed from the table and all the HMVP candidates afterwards are moved forward.

HMVP candidates could be used in the merge candidate list construction process. The latest several HMVP candidates in the table are checked in order and inserted to the candidate list after the TMVP candidate. Redundancy check is applied on the HMVP candidates to the spatial or temporal merge candidate.

To reduce the number of redundancy check operations, the following simplifications are introduced:
a. Number of HMPV candidates is used for merge list generation is set as (N<=4)?M: (8−N), wherein N indicates number of existing candidates in the merge list and M indicates number of available HMVP candidates in the table.
b. Once the total number of available merge candidates reaches the maximally allowed merge candidates minus 1, the merge candidate list construction process from HMVP is terminated.

The following describes pair-wise average merge candidate derivation. Pairwise average candidates are generated by averaging predefined pairs of candidates in the existing merge candidate list, and the predefined pairs are defined as {(0, 1), (0, 2), (1, 2), (0, 3), (1, 3), (2, 3)}, where the numbers denote the merge indices to the merge candidate list. The averaged motion vectors are calculated separately for each reference list. If both motion vectors are available in one list, these two motion vectors are averaged even when they point to different reference pictures; if only one motion vector is available, use the one directly; if no motion vector is available, keep this list invalid.

When the merge list is not full after pair-wise average merge candidates are added, the zero MVPs are inserted in the end until the maximum merge candidate number is encountered.

The following describes bi-prediction with CU-level weight (BCW). In some examples, the bi-prediction signal is generated by averaging two prediction signals obtained from two different reference pictures and/or using two different motion vectors. In VVC, the bi-prediction mode is extended beyond simple averaging to allow weighted averaging of the two prediction signals.

$$P_{bi\text{-}pred}=((8-w)*P_0+w*P_1+4)>>3.$$

Five weights are allowed in the weighted averaging bi-prediction, $w \in \{-2, 3, 4, 5, 10\}$. For each bi-predicted CU, the weight w is determined in one of two ways: 1) for a non-merge CU, the weight index is signalled after the motion vector difference; 2) for a merge CU, the weight index is inferred from neighbouring blocks based on the merge candidate index. BCW is only applied to CUs with 256 or more luma samples (i.e., CU width times CU height is greater than or equal to 256). For low-delay pictures, all 5 weights are used. For non-low-delay pictures, only 3 weights ($w \in \{3,4,5\}$) are used.

In some examples, at the encoder (e.g., video encoder 200), fast search algorithms are applied to find the weight index without significantly increasing the encoder complexity. These algorithms are summarized as follows, and may be found in JVET-L0646: Su et. al "CE4-related: Generalized bi-prediction improvements combined from JVET-L0197 and JVET-L0296," Joint Video Experts Team (WET) of ITU-T SG 16 WP 3 and ISO/IEC JTC 1/SC 29/WG 11, 12$^{th}$ Meeting: Macao, CN, 3-12 Oct. 2018. When combined with AMVR (adaptive motion vector resolution), unequal weights are only conditionally checked for 1-pel and 4-pel motion vector precisions if the current picture is a low-delay picture.

When combined with affine, affine ME (motion estimation) may be performed for unequal weights if and only if the affine mode is selected as the current best mode. When the two reference pictures in bi-prediction are the same, unequal weights may be only conditionally checked. Unequal weights may not be searched when certain conditions are met, depending on the POC distance between current picture and its reference pictures, the coding QP, and the temporal level.

The BCW weight index may be coded using one context coded bin followed by bypass coded bins. The first context coded bin indicates if equal weight is used; and if unequal weight is used, additional bins are signalled using bypass coding to indicate which unequal weight is used.

Weighted prediction (WP) is a coding tool supported by the H.264/AVC and HEVC standards to efficiently code video content with fading. Support for WP was also added into the VVC standard. WP allows weighting parameters (weight and offset) to be signalled for each reference picture in each of the reference picture lists L0 and L1. Then, during motion compensation, the weight(s) and offset(s) of the corresponding reference picture(s) are applied. WP and BCW are designed for different types of video content. In order to avoid interactions between WP and BCW, which may complicate VVC decoder design, if a CU uses WP, then the BCW weight index is not signalled, and w is inferred to be 4 (i.e., equal weight is applied). For a merge CU, the weight index is inferred from neighbouring blocks based on the merge candidate index. This (e.g., such inferring) can be applied to both normal merge mode and inherited affine merge mode. For constructed affine merge mode, the affine motion information is constructed based on the motion information of up to 3 blocks. The BCW index for a CU using the constructed affine merge mode is set equal to the BCW index of the first control point MV.

In VVC, CIIP (combined intra inter prediction) and BCW may not be jointly applied for a CU. When a CU is coded with CIIP mode, the BCW index of the current CU is set to 2, e.g., equal weight.

Figure 9:
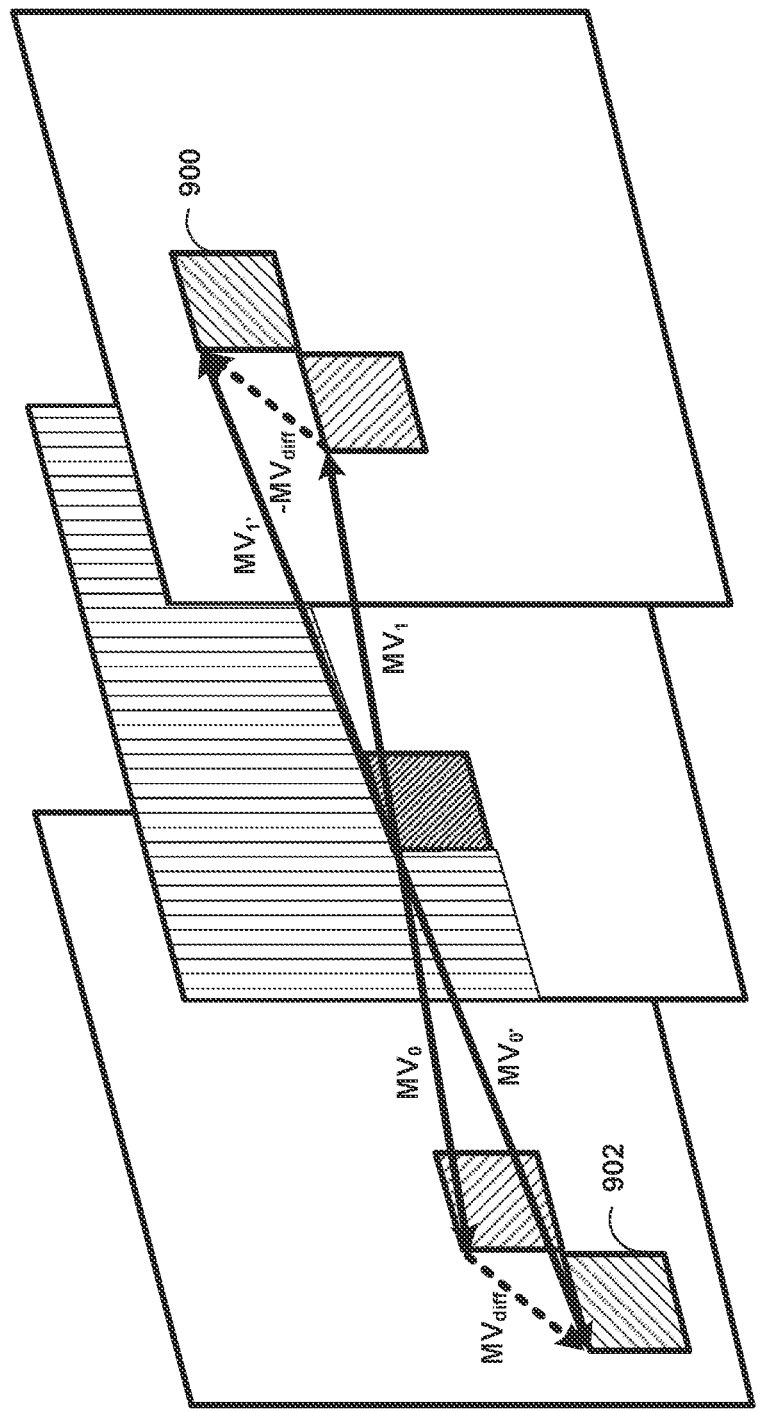
FIG. 9 is a conceptual diagram illustrating an example of bilateral matching.

The following describes decoder side motion vector refinement in VVC. In the Versatile Video Coding standard (VVC), the bilateral-matching based decoder side motion vector refinement (DMVR) is applied to increase the accuracy of the MVs of a bi-prediction merge candidate. The BM (bilateral-matching) method calculates the SAD (sum of absolute difference) between the two candidate blocks in the reference picture list L0 and list L1. As illustrated in FIG. 9, the SAD between the blocks 900 and 902 based on each MV candidate around the initial MV is calculated. The MV candidate with the lowest SAD becomes the refined MV and used to generate the bi-predicted signal. The SAD of the initial MVs is subtracted by ¼ of the SAD value to serve as regularization term. The temporal distances (i.e., Picture Order Count (POC) difference) from two reference pictures to the current picture may be the same, therefore, the MVD0 is just the opposite sign of MVD1.

The refinement search range may be two integer luma samples from the initial MV. The searching includes the integer sample offset search stage and fractional sample refinement stage. Twenty-five points full search may be applied for integer sample offset searching. The SAD of the initial MV pair is first calculated. If the SAD of the initial MV pair is smaller than a threshold, the integer sample stage of DMVR is terminated. Otherwise SADs of the remaining 24 points are calculated and checked in raster scanning order. The point with the smallest SAD is selected as the output of integer sample offset searching stage.

The integer sample search is followed by fractional sample refinement. To save the calculational complexity, the fractional sample refinement is derived by using parametric error surface equation, instead of additional search with SAD comparison. The fractional sample refinement is conditionally invoked based on the output of the integer sample search stage. When the integer sample search stage is terminated with center having the smallest SAD in either the first iteration or the second iteration search, the fractional sample refinement is further applied.

In parametric error surface based sub-pixel offsets estimation, the center position cost and the costs at four neighboring positions from the center are used to fit a 2-D parabolic error surface equation of the following form $$E(x,y)=A(x-x_{min})^2+(y-y_{min})^2+C \quad (1)$$

where $(x_{min}, y_{min})$ corresponds to the fractional position with the least cost and C corresponds to the minimum cost value. By solving the above equations by using the cost value of the five search points, the $(x_{min}, y_{mi}n)$ is computed as:

$$x_{min}=(E(-1,0)-E(1,0))/(2(E(-1,0)+E(1,0)-2E(0,0))) \quad (2)$$

$$y_{min}=(E(0,-1)-E(0,1))/(2((0,-1)+E(0,1)-2E(0,0))) \quad (3)$$

The value of $x_{min}$ and $y_{min}$ are automatically constrained to be between −8 and 8 since all cost values are positive and the smallest value is E(0,0). This corresponds to half peal offset with 1/16th-pel MV accuracy in VVC. The computed fractional $(x_{min}, y_{min})$ are added to the integer distance refinement MV to get the sub-pixel accurate refinement delta MV.

In VVC, the resolution of the MVs is 1/16 luma samples. The samples at the fractional position are interpolated using a 8-tap interpolation filter. In DMVR, the search points are surrounding the initial fractional-pel MV with integer sample offset, therefore the samples of those fractional position need to be interpolated for DMVR search process. To reduce the calculation complexity, the bi-linear interpolation filter is used to generate the fractional samples for the searching process in DMVR. Another important effect is that by using bi-linear filter is that with 2-sample search range, the DVMR does not access more reference samples compared to the normal motion compensation process. After the refined MV is attained with DMVR search process, the normal 8-tap interpolation filter is applied to generate the final prediction. In order to not access more reference samples to normal MC process, the samples, which is not needed for the interpolation process based on the original MV but is needed for the interpolation process based on the refined MV, will be padded from those available samples.

When the width and/or height of a CU are larger than 16 luma samples, it will be further split into subblocks with width and/or height equal to 16 luma samples for the DMVR process.

In VVC, the DMVR can be applied for the CUs which are coded with following modes and features: CU level merge mode with bi-prediction MV, One reference picture is in the past and another reference picture is in the future with respect to the current picture, The distances (i.e., POC difference) from two reference pictures to the current picture are same, Both reference pictures are short-term reference pictures, CU has more than 64 luma samples, Both CU height and CU width are larger than or equal to 8 luma samples, BCW weight index indicates equal weight, WP is not enabled for the current block, and/or CIIP mode is not used for the current block.

The following describes bi-directional optical flow. Bi-directional optical flow (BDOF) is used to refine the bi-prediction signal of luma samples in a CU at the 4×4 sub-block level. As its name indicates, the BDOF mode is based on the optical flow concept, which assumes that the motion of an object is smooth. For each 4×4 sub-block, a motion refinement $(v_x, v_y)$ is calculated by minimizing the difference between the L0 and L1 prediction samples. The motion refinement is then used to adjust the bi-predicted sample values in the 4×4 sub-block. The following steps are applied in the BDOF process.

First, the horizontal and vertical gradients, $$\frac{\partial I^{(k)}}{\partial x}(i, j) \text{ and } \frac{\partial I^{(k)}}{\partial y}(i, j), k = 0, 1,$$

of the two prediction signals are computed by directly calculating the difference between two neighboring samples, i.e., $$\frac{\partial I^{(k)}}{\partial x}(i, j) = \left(I^{(k)}(i + 1, j) \gg \text{shift1}\right) - \left(I^{(k)}(i - 1, j) \gg \text{shift1}\right) \quad (1\text{-}6\text{-}1)$$

-continued $$\frac{\partial I^{(k)}}{\partial y}(i, j) = \left(I^{(k)}(i, j+1) \gg \text{shift1}\right) - \left(I^{(k)}(i, j-1) \gg \text{shift1}\right)$$

where $I^{(k)}(i,j)$ are the sample value at coordinate (i,j) of the prediction signal in list k, k=0,1, and shift1 is calculated based on the luma bit depth, bitDepth, as shift1 is set to be equal to 6.

Then, the auto- and cross-correlation of the gradients, $S_1$, $S_2$, $S_3$, $S_5$ and $S_6$, are calculated as $$S_1 = \Sum_{(i,j) \in \Omega} |\psi_x(i,j)|, S_3 = \Sum_{(i,j) \in \Omega} \theta(i,j) \cdot (-\text{sign}(\psi_x(i,j)))$$

$$S_2 = \Sum_{(i,j) \in \Omega} \psi_x(i,j) \cdot \text{sign}(\psi_y(i,j))$$

$$S_5 = \Sum_{(i,j) \in \Omega} |\psi_y(i,j)|, S_6 = \Sum_{(i,j) \in \Omega} \theta(i,j) \cdot (-\text{sign}(\psi_y(i,j))) \quad (1\text{-}6\text{-}2)$$

where $$\psi_x(i,j) = \left(\frac{\partial I^{(1)}}{\partial x}(i,j) + \frac{\partial I^{(0)}}{\partial x}(i,j)\right) \gg \text{shift3} \quad (1\text{-}6\text{-}3)$$

$$\psi_y(i,j) = \left(\frac{\partial I^{(1)}}{\partial y}(i,j) + \frac{\partial I^{(0)}}{\partial y}(i,j)\right) \gg \text{shift3}$$

$$\theta(i,j) = \left(I^{(0)}(i,j) \gg \text{shift2}\right) - \left(I^{(1)}(i,j) \gg \text{shift2}\right)$$

where $\Omega$ is a 6×6 window around the 4×4 sub-block, the value of shift2 is set to be equal to 4, and the value of shift3 is set to be equal to 1.

The motion refinement ($v_x$, $v_y$) is then derived using the cross- and auto-correlation terms using the following:

$$v_x = S_1 > 0 ? \text{clip3}(-th_{BIO}', th_{BIO}', -((S_3 \ll 2) \gg \lfloor \log_2 S_1 \rfloor)) : 0$$

$$v_y = S_5 > 0 ? \text{clip3}(-th_{BIO}', th_{BIO}', -(((S_6 \ll 2) - ((v_x \cdot S_2) \gg 1)) \gg \lfloor \log_2 S_5 \rfloor)) : 0 \quad (1\text{-}6\text{-}4)$$

where, $th_{BIO}' = 1 \ll 4$. $\lfloor \cdot \rfloor$ is the floor function.

Based on the motion refinement and the gradients, the following adjustment is calculated for each sample in the 4×4 sub-block:

$$b(x, y) = v_x \cdot \left(\frac{\partial I^{(1)}(x,y)}{\partial x} - \frac{\partial I^{(0)}(x,y)}{\partial x}\right) + v_y \cdot \left(\frac{\partial I^{(1)}(x,y)}{\partial y} - \frac{\partial I^{(0)}(x,y)}{\partial y}\right) \quad (1\text{-}6\text{-}5)$$

Finally, the BDOF samples of the CU are calculated by adjusting the bi-prediction samples as follows:

$$\text{pred}_{BDOF}(x,y) = (I^{(0)}(x,y) + I^{(1)}(x,y) + b(x,y) + o_{offset}) \gg \text{shift5} \quad (1\text{-}6\text{-}6)$$

Wherein, shift5 is set equal to Max(3, 15−BitDepth) and the variable $o_{offset}$ is set equal to (1<<(shift5−1)).

These values are selected such that the multipliers in the BDOF process do not exceed 15-bit, and the maximum bit-width of the intermediate parameters in the BDOF process is kept within 32-bit.

Figure 10:
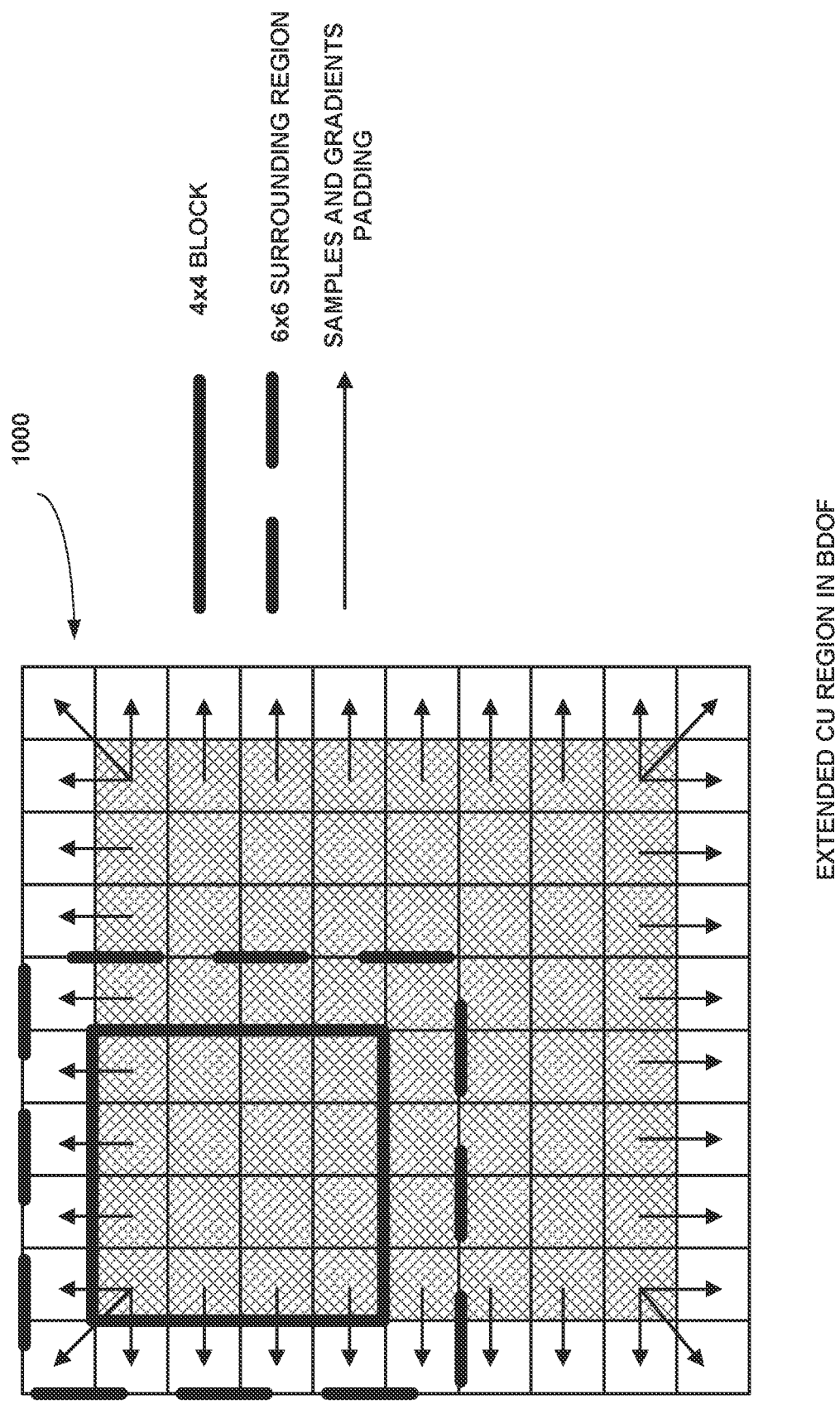
FIG. 10 is a conceptual diagram illustrating an example of extended coding unit (CU) region used in bi-directional optical flow (BDOF).

In order to derive the gradient values, some prediction samples $I^{(k)}(i,j)$ in list k (k=0,1) outside of the current CU boundaries need to be generated. As depicted in FIG. 10, the BDOF uses one extended row/column around the boundaries of CU 1000. In order to control the computational complexity of generating the out-of-boundary prediction samples, prediction samples in the extended area (white positions) are generated by taking the reference samples at the nearby integer positions (using floor( ) operation on the coordinates) directly without interpolation, and the normal 8-tap motion compensation interpolation filter is used to generate prediction samples within the CU (hashed positions). These extended sample values may be used in gradient calculation only. For the remaining steps in the BDOF process, if any sample and gradient values outside of the CU boundaries are needed, they are padded (i.e., repeated) from their nearest neighbors.

BDOF may be used to refine the bi-prediction signal of a CU at the 4×4 subblock level. BDOF may be applied to a CU if it satisfies all the following conditions: The CU is coded using "true" bi-prediction mode, i.e., one of the two reference pictures is prior to the current picture in display order and the other is after the current picture in display order, The CU is not coded using affine mode or the SbTMVP merge mode, CU has more than 64 luma samples, Both CU height and CU width are larger than or equal to 8 luma samples, BCW weight index indicates equal weight, WP is not enabled for the current CU, and/or CLIP mode is not used for the current CU.

Figure 11:
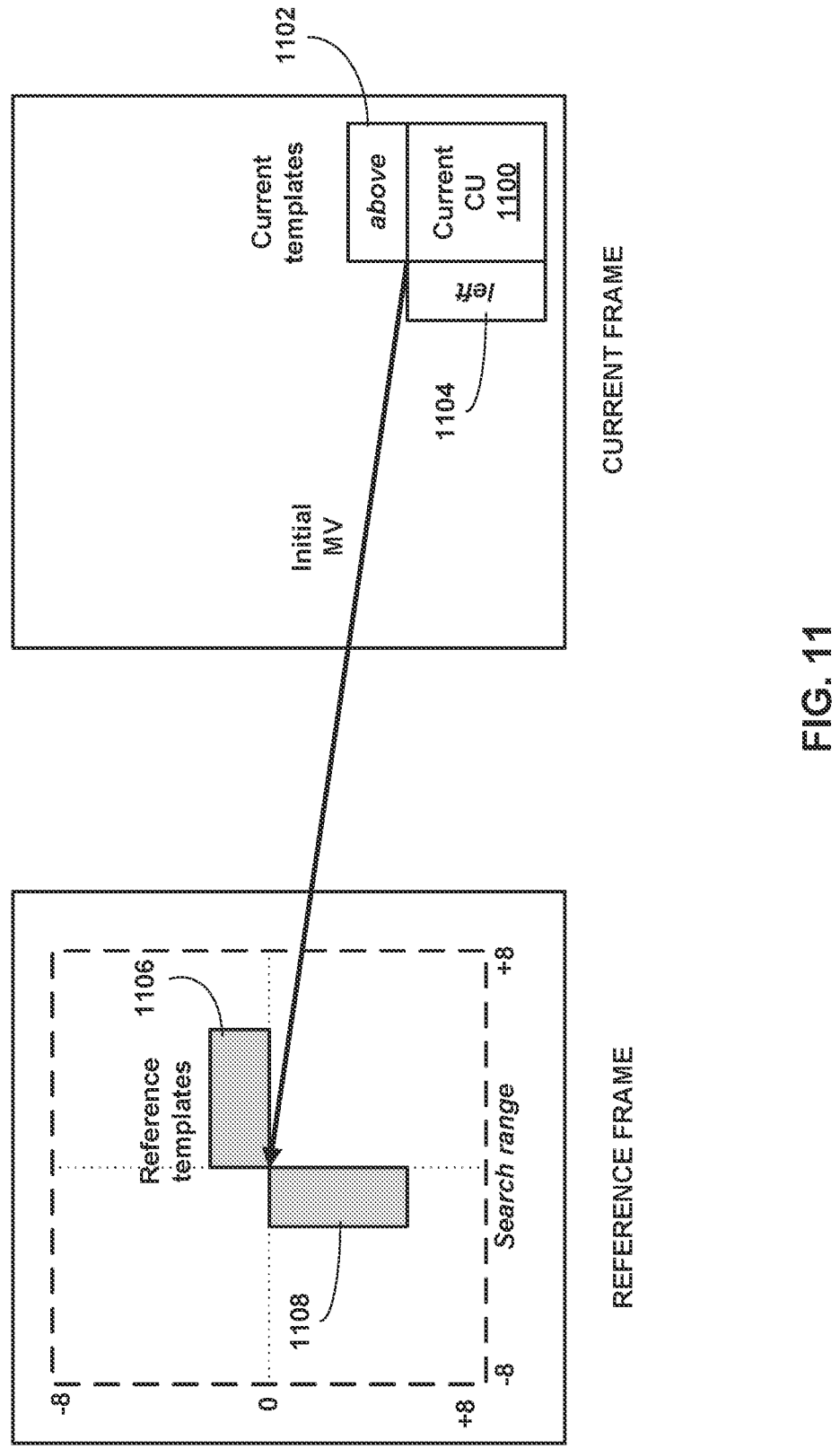
FIG. 11 is a conceptual diagram illustrating an example of template matching on a search area around an initial motion vector (MV).

The following describes template matching. Template matching (TM) is a decoder-side MV derivation method to refine the motion information of the current CU by finding the closest match between a template (i.e., top and/or left neighbouring blocks of the current CU) in the current picture and a block (i.e., same size to the template) in a reference picture. As illustrated in FIG. 11, a better MV is to be searched around the initial motion of the current CU 1100 within a [−8, +8]-pel search range. With an AMVP candidate selected based on initial matching error, the MVP of the AMVP candidate is refined by template matching. With a merge candidate indicated by signaled merge index, merged MVs of the merge candidate corresponding to L0 and L1 are refined independently by template matching, and then the less accurate one is further refined again with the better one as a prior.

For a cost function, when a motion vector points to a fractional sample position, motion compensated interpolation may be needed. To reduce complexity, bi-linear interpolation instead of regular 8-tap DCT-IF interpolation is used for template matching to generate templates on reference pictures. The matching cost C of template matching is calculated as follows:

$$C = \text{SAD} + w \ast (|MV_x - MV^s x| + |MV_y - MV^s y|),$$

where w is a weighting factor which can be set to an integer number such as 0, 1, 2, 3 or 4, and MV and $MV^s$ indicate the currently testing MV and the initial MV (e.g., a MVP candidate in AMVP mode or merged motion in merge mode), respectively. SAD is used as the matching cost of template matching.

When TM is used, motion is refined by using luma samples only. The derived motion will be used for both luma and chroma for MC (motion compensation) inter prediction. After MV is determined, final MC is performed using 8-taps interpolation filter for luma and 4-taps interpolation filter for chroma.

For a search method, MV refinement is a pattern-based MV search with the criterion of template matching cost and a hierarchical structure. Two search patterns are supported—a diamond search and a cross search for MV refinement. The hierarchical structure specifies an iterative process to refine MV, starting at a coarse MVD precision (e.g., quarter-pel) and ending at a fine one (e.g., ⅛-pel). The MV is directly searched at quarter luma sample MVD precision with diamond pattern, followed by quarter luma sample MVD precision with cross pattern, and then this is followed by one-eighth luma sample MVD refinement with cross pattern. The search range of MV refinement is set equal to (−8, +8) luma samples around the initial MV. When the current block is of bi-prediction, both MVs are refined independently, and then the best of which (in terms of matching cost) is set as a prior to further refine the other MV with BCW weight values.

The template matching may be as proposed in JVET-J0021: Chen et. al "Description of SDR, HDR and 360° video coding technology proposal by Qualcomm and Technicolor—low and high complexity versions," Joint Video Experts Team (JVET) of ITU-T SG 16 WP 3 and ISO/IEC JTC 1/SC 29/WG 11, 10$^{th}$ Meeting: San Diego, US, 10-20 Apr. 2018, and JVET-U0100: Chang et. al "Compression efficiency methods beyond VVC," Joint Video Experts Team (WET) of ITU-T SG 16 WP 3 and ISO/IEC JTC 1/SC 29/WG 11, 21$^{st}$ Meeting: by teleconference, 6-15 Jan. 2021 is applied to AMVP mode and merge mode in the proposals.

The regular merge candidate list is constructed in the order of the following candidates: For spatial MVPs from spatial neighbor CUs: first 4 available candidates are selected among the order of Above neighbour CU (A), Left neighbour CU (L), Above-Right neighbour CU (AR), Left-Below neighbour CU (LB), Left-Above neighbour CU (LA). For temporal MVP from collocated CUs: Only one candidate is added. For History-based MVP: The motion information of a previously coded block is stored in a table and used as MVP for the current CU. For Pairwise average MVP: Pairwise average candidates are generated by averaging predefined pairs of candidates in the existing regular merge candidate list. Then Zero MVs are added.

When TM is applied to merge mode, a separate TM merge candidate list is constructed by refining the MVPs of the regular merge candidates based on the template matching.

The following describes bilateral matching. Bilateral matching (BM) is a technique that refines a pair of two initial motion vectors MV0 and MV1. Generally, BM searches around the MV0 and MV1 to derive refined MVs MV0' and MV1' that minimizes the block matching cost. The block matching cost measures the similarity between the two motion compensated predictors generated by the two MVs (some typical criterions are: sum of absolute difference (SAD), sum of absolute transformed difference (SATD), sum of square error (SSE), et al). It may also include a regularization term that is derived based on the MV differences between the current MV pair and the initial MV pair. Some certain constrain may also be applied to the MV differences between MVD0 (MV0'-MV0) and MVD1 (MV1'-MV1). Typically, it is assumed that MVD0 and MVD1 may be proportional to the temporal distances (TD) between the current picture and the reference pictures pointed by the two MVs. However, in some applications, it may be that MVD0 is equal to −MVD1.

Accordingly, in the example of FIG. 11, video decoder 300 may determine current templates that include above current template 1102 and left current template 1104 that are above and left of current CU 1100, respectively. Video decoder 300 may determine reference templates, including above reference template 1106 and left reference template 1106, based on an initial MV. Video decoder 300 may determine a SAD between above current templates (e.g., above current template 1102 and left current template 1104) and reference templates (e.g., above reference template 1106 and left reference template 1108).

Video decoder 300 may then modify the initial MV to generate another MV within the search range. Video decoder 300 may determine another set of reference templates based on the other MV, and determine SAD between the other set of reference templates and the current templates. Video decoder 300 may repeat such operations in accordance with a criteria until video decoder 300 identifies reference templates having lowest SAD. Video decoder 300 may determine the motion vector that identified the reference templates having the lowest SAD as the motion vector for the current CU 1100.

As described above, some decoder side motion derivation methods typically are based on calculation of the similarity/distortion between target samples and reference samples. For example, in the TM (template matching) method, as illustrated in FIG. 11, the reference samples are the reference template, and the target samples are the current template. For example, in the BM (bilateral matching) method, the target samples can be from 1st predictor generated by using one of the MV, and the reference samples can be from the 2nd predictor generated by using the other MV.

In accordance with one or more example techniques described in this disclosure, a decoder side motion derivation technique may use a sample's spatial correlation. Video encoder 200 and/or video decoder 300 may derive MV or assigns likelihood to MV based on a cost function that is calculated based on at least one sample from the hypothesis of the current block and at least one sample from the neighboring block. The result of the cost function may be a cost value, also referred to as a correlation value.

The samples from the neighboring block can be the reconstructed sample of the neighboring block or can be the predicted samples of the neighboring block. The hypothesis of the current block can be the hypothesis of the reconstructed current block or can be the hypothesis of prediction block.

Figure 12:
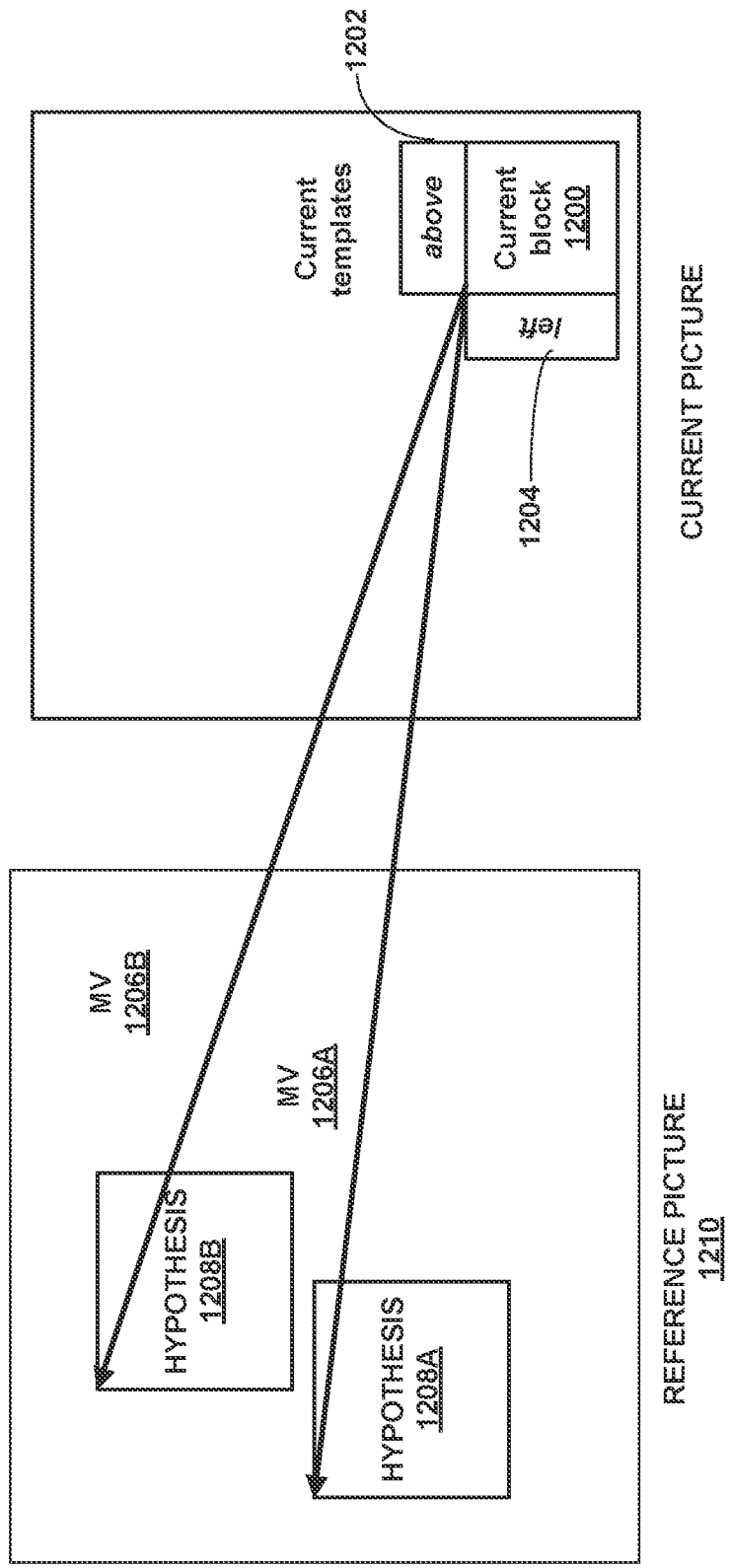
FIG. 12 is a conceptual diagram illustrating an example of hypotheses of a current block and associated motion vectors.

The following describes example ways in which to determine hypotheses of a current block. For instance, FIG. 12 is a conceptual diagram illustrating an example of hypotheses of a current block and associated motion vectors. FIG. 12 illustrates an example that includes current block 1200 and hypothesis 1208A of current block 1200 identified by motion vector 1206A and hypothesis 1208B of current block 1200 identified by motion vector 1206B. Hypothesis 1208A and 1208B of current block 1200 may be referred to as hypotheses 1208 of current block 1200. Motion vectors 1206A and 1206B may be referred to as motion vectors 1206.

In accordance with one or more examples described in this disclosure, video decoder 300 may determine a plurality of hypotheses 1208 of current block 1200 based on a plurality of motion vectors 1206. Each of the plurality of motion vectors 1206 may be associated with one of the plurality of hypotheses 1208 of current block 1200. For instance, motion vector 1206A is associated with hypothesis 1208A of current block 1200, and motion vector 1206B is associated with hypothesis 1208B of current block 1200. A motion vector that is associated with a hypothesis of the current block may refer to the motion vector that is used to generate the hypothesis of the current block. In one or more examples, the plurality of motion vectors 1206 used to determine the plural of hypotheses 1208 of current block 1200 may be within a search area defined by an initial motion vector for current block 1200. For instance, the search area defined by the initial motion vector for current block 1200 may be similar to the search area illustrated in FIG. 11.

Each of the plurality of hypotheses 1208 of current block 1200 is based on a set of samples, such as a set of samples in reference picture 1210. That is, each of the plurality of hypotheses 1208 of current block 1200 is based on a set of samples in reference picture 1210 for determining a motion vector for the current block. As one example, and as illustrated in FIG. 12, plurality of hypotheses 1208 of current block 1200 may be the actual samples in reference picture 1210. In such examples, each of the plurality of hypotheses 1208 of current block 1200 may be referred to as a hypothesis of prediction block. As another example, plurality of hypotheses 1208 of current block 1200 may be actual samples in reference picture 1210 summed with residual values that video encoder 200 signals. In such examples, each of the plurality of hypotheses 1208 of current block 1200 may be referred to as a hypothesis of a reconstructed current block. For instance, the residual values that video encoder 200 signals may be values indicative of the difference between current block 1200 and the actual prediction block that video decoder 300 will use to reconstruct current block 1200. The residual values that video encoder 200 may not be values indicative of the difference between current block 1200 and the samples identified by motion vectors 1206.

The actual prediction block that video decoder 300 uses to reconstruct current block 1200 and plurality of hypotheses 1208 of current block 1200 should not be confused. Using techniques described in this disclosure, and described in more detail below, video decoder 300 may evaluate plurality of hypotheses 1208 of current block 1200 to determine a motion vector for current block 1200. From the determined motion vector for current block 1200, video decoder 300 may determine the actual prediction block for current block 1200. It is possible that one of plurality of hypotheses 1208 is the actual prediction block, such as where the plurality of hypotheses 1208 are hypotheses of prediction block, but the example techniques are not so limited.

The respective motion vectors 1206 associated with respective hypotheses 1208 of current block 1200 may identify a top-left sample of the set of samples used to determine the respective hypotheses 1208 of current block 1200. For instance, as illustrated in FIG. 12, motion vector 1206A identifies a top-left sample of the set of samples used to determine hypothesis 1208A of current block 1200, and motion vector 1206B identifies a top-left sample of the set of samples used to determine hypothesis 1208B of current block 1200. As comparison, the motion vector in FIG. 11 does not identify a top-left sample of the reference templates (e.g., top reference template 1106 and left reference template 1108).

Video decoder 300 may determine one or more neighboring samples that are proximate to samples of current block 1200 and in the same picture as current block 1200. For instance, FIG. 12 illustrates above samples 1202 and left samples 1204, which are examples of the one or more neighboring samples that are proximate to samples of current block 1200. Above samples 1202 may include a row samples above current block 1200 and a row above that row of samples. Left samples 1204 may include a column of samples left of current block 1200, and a column left that column of samples.

For each of the plurality of hypotheses 1208 of current block 1200, video decoder 300 may determine respective correlation values (e.g., referred to as cost or cost of motion vectors) between at least one sample of a respective hypothesis 1208A or 1208B of current block 1200 and at least one sample of the one or neighboring samples (e.g., at least one sample of above samples 1202 and left samples 1204). Example ways of determining the respective correlation values is described in more detail below, but the techniques should not be considered limited to the below examples. In some examples, the respective correlation values may be an Nth-order derivative between the at least one sample of the respective hypotheses 1208 of current block 1200 and the at least one of the one or more neighboring samples (e.g., at least one of above samples 1202 and/or left samples 1204). For instance, the Nth-order derivative may be a second order derivative (referred to as a Laplacian).

In one or more examples, video decoder 300 may determine a motion vector for current block 1200 based the determined respective correlation values. As one example, video decoder 300 may determine a hypothesis of current block 1200 from the plurality of hypotheses 1208 of current block 1200 having a correlation value that indicates highest correlation among the respective plurality of hypotheses 1208 of current block 1200. Video decoder 300 may determine a motion vector for the determined hypothesis, and determine the motion vector for the current block based on the determined motion vector for the determined prediction hypothesis.

As an example, video decoder 300 may determine a first correlation value for hypothesis 1208A and a second correlation value for hypothesis 1208B. In this example, assume that the second correlation value indicates higher correlation than the first correlation value (e.g., lower cost). Accordingly, video decoder 300 may determine that hypothesis 1208B of current block 1200 from the plurality of hypotheses 1208 of current block 1200 has a correlation value that indicates highest correlation among the respective plurality of hypotheses 1208 of current block 1200. Video decoder 300 may determine (e.g., identify) motion vector 1206B for the determined hypothesis (e.g., hypothesis 1208B), and determine the motion vector for current block 1200 based on the determined motion vector (e.g., motion vector 1206B) for the determined prediction hypothesis (e.g., hypothesis 1208B). For instance, video decoder 300 may set the motion vector for current block 1200 equal to motion vector 1206B, or may scale or otherwise modify motion vector 1206B and set the result as the motion vector for current block 1200.

As another example to determine a motion vector for current block 1200 based the determined respective correlation values, video decoder 300 may construct a list of motion vectors. For instance, video decoder 300 may construct a list of motion vectors based on the determined respective correlation values for the plurality of hypotheses 1208 of current block 1200. Video decoder 300 may determine an index into the list of motion vectors, and determine the motion vector for current block 1200 based on the index into the list of motion vectors.

As an example, similar to above, video decoder 300 may determine a first correlation value for hypothesis 1208A and a second correlation value for hypothesis 1208B. In this example, assume that the second correlation value indicates higher correlation than the first correlation value (e.g., lower cost). In this example, video decoder 300 may construct a list of motion vectors that includes motion vector 1206A and motion vector 1206B. Because the correlation value for hypothesis 1208B indicated higher correlation (e.g., lower cost) than hypothesis 1208A, video decoder 300 may identify motion vector 1206B at a lower index value in the list as compared to motion vector 1206A. This is because there is a higher likelihood that motion vector 1206B will be selected to determine the motion vector for current block 1200, and less bandwidth is needed to signal an index having a lower index value as compared to an index having a larger index value.

Figure 13:
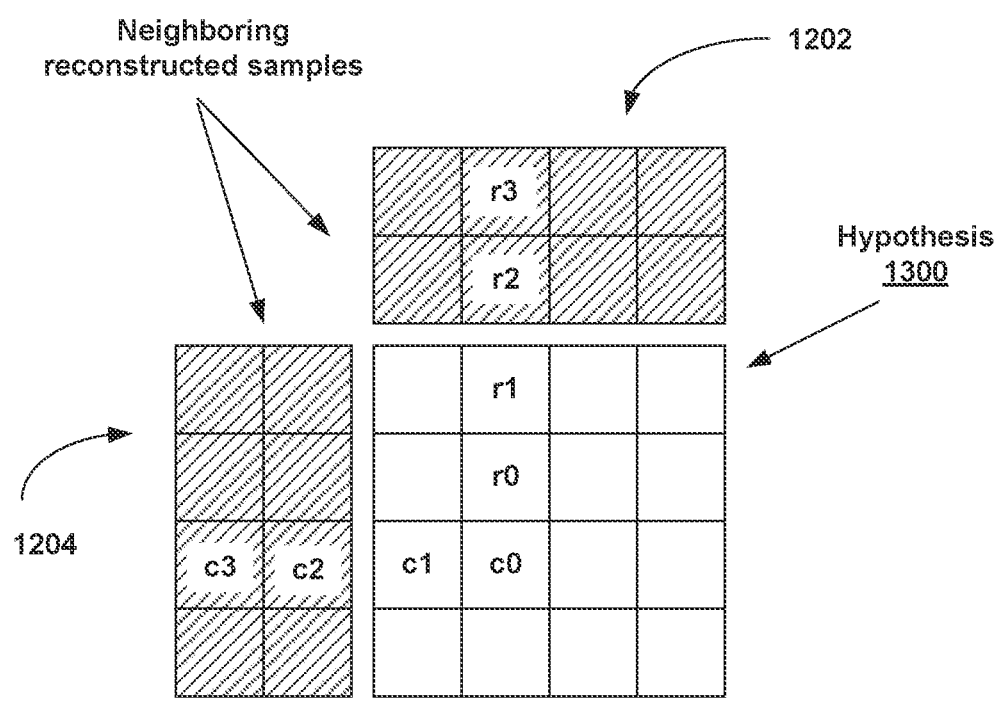
FIG. 13 is a conceptual diagram illustrating an example of samples used for spatial correlation calculation.

The following describes example ways in which to determine the correlation values described above, also referred to as a cost or cost of motion vector. FIG. 13 is a conceptual diagram illustrating an example of samples used for spatial correlation calculation.

An example is shown in FIG. 13, wherein the hashed shaded samples are from neighboring block(s) (e.g., above samples 1202 and left samples 1204 of FIG. 12) and white colored samples represent the hypothesis 1300 of the current block 1200. For instance, examples of hypothesis 1300 include hypothesis 1208A or hypothesis 1208B. In this example, two columns of reconstructed samples from left neighbor, two rows of reconstructed samples from above neighbor, and top and left two boundary samples of the prediction blocks are used as the input for the cost function to determine the correlation values (e.g., cost values).

In the derivation process of MV, similar to TM or BM, given an initial MV (e.g., MV predictor), costs of MVs within a search area are calculated (e.g., by video encoder 200 and/or video decoder 300), and then the MV with the minimum cost is selected as the output. Some predefined search pattern, search range may be applied, also some early termination techniques may be applied as well.

Stated another way, in the above description of "costs of MVs," one example of the costs of MVs is the respective correlation values between at least one sample of the one or more neighboring samples (e.g., from above samples 1202 and/or left samples 1204) and hypotheses 1208 of current block 1200, where each one of hypotheses 1208 is represented by hypothesis 1300 in FIG. 13. The term "cost of MVs" is used to indicate that each one of hypotheses 1208 is associated with a respective one of motion vectors 1206.

For instance, the cost of motion vector 1206A is equal to the correlation value (also called cost or cost value) of at least one sample from hypothesis 1208A and at least one sample from one or more neighboring samples (e.g., above samples 1202 and left samples 1204). Examples of the at least one sample from hypothesis 1208A are samples c1, c0, r1, and r0 in FIG. 13 of hypothesis 1300. The cost of motion vector 1206B is equal to the correlation value (also called cost or cost value) of at least one sample from hypothesis 1208B and at least one sample from one or more neighboring samples (e.g., above samples 1202 and left samples 1204). Examples of the at least one sample from hypothesis 1208B are samples c1, c0, r1, and r0 in FIG. 13 of hypothesis 1300.

Video decoder 300 may determine such correlation values for each of hypotheses 1208 to determine a motion vector for current block 1200. For example, video decoder 300 may determine a hypothesis of current block 1200 from the plurality of hypotheses 1208 of current block 1200 having a correlation value that indicates highest correlation (e.g., lowest cost) among the respective plurality of hypotheses 1208 of current block 1200. Video decoder 300 may determine a motion vector for the determined hypothesis, and determine the motion vector for the current block based on the determined motion vector for the determined hypothesis. For example, motion vector 1206A and motion vector 1206B may be considered as candidate motion vectors, and video decoder 300 selects one of motion vector 1206 and motion vector 1206B to determine the motion vector for the current block.

As another example way in which video decoder 300 may determine the correlation values for each of hypotheses 1208 to determine a motion vector for the current block 1200 may include video decoder 300 assigning likelihood to MV candidates and used as ordering criterion for the MV candidates for efficient coding of the index of the selected MV candidate. For example, a MV candidate with a lower cost is assigned with a smaller index (indicating relatively higher likelihood among MV candidates).

For instance, if the correlation value for hypothesis 1208B indicates higher correlation than the correlation value for hypothesis 1208B, then video decoder 300 may include motion vector 1206A in the list with a smaller index than motion vector 1206B. Motion vector 1206A and motion vector 1206B may be considered as candidate motion vectors. Then, to determine the motion vector that is to be used for current block 1200, video decoder 300 may receive signaling from video encoder 200 of an index value into the list. Video decoder 300 may determine the motion vector for current block 1200 based on the motion vector identified by the index into the list.

Therefore, in the above example, video decoder 300 may construct a list of motion vectors based on the determined respective correlation values for the plurality of hypotheses 1208 of current block 1200. Video decoder 300 determine an index into the list of motion vectors (e.g., based on signaling from video encoder 200 or possibly some other inferential techniques). Video decoder 300 may determine the motion vector for current block 1200 based on the index into the list of motion vectors.

The following describes a cost function design. That is, the following describes example ways in which to determine the correlation values between hypotheses 1208 and one or more neighboring samples (e.g., above samples 1202 and/or left samples 1204). In one example, the cost function can be derived based on N-order derivative, for example gradient based, Laplacian (second order derivative) based and so on. The cost function may be a combination of several metrics, for example, video decoder 300 may calculate two Laplacian costs using different samples and the final cost is derived based on those two Laplacian costs.

In one example, the cost function is: $\text{cost}_1 = \Sigma_{r \in top\ row} |2r_1 - r_2 - r_0| + \Sigma_{c \in left\ col.} |2c_1 - c_2 - c_0|$, where r denotes a certain vector of sample as illustrated in FIG. 13 and so does c.

In another example, the cost function is: $\text{cost}_2 = \Sigma_{r \in top\ row} |2r_2 - r_3 - r_1| + \Sigma_{c \in left\ col.} |2c_2 - c_3 - c_1|$.

In still another example, the cost function is: $\text{cost}_3 = \Sigma_{r \in top\ row} |2r_2 - r_3 - r_1 - (2r_1 - r_2 - r_0)| + \Sigma_{c \in left\ col.} |2c_2 - c_3 - c_1 - (2c_1 - c_2 - c_0)| = \Sigma_{r \in top\ row} |3r_2 - r_3 - 3r_1 + r_0| + \Sigma_{c \in left\ col.} |3c_2 - c_3 - 3c_1 + c_0|$.

In still another example, the cost function is: $\text{cost}_4 = \Sigma_{r \in top\ row} |2r_2 - r_3 - r_1 + (2r_1 - r_2 - r_0)| + \Sigma_{c \in left\ col.} |2c_2 - c_3 - c_1 + (2c_1 - c_2 - c_0)| = \Sigma_{r \in top\ row} |r_2 - r_3 + r_1 - r_0| + \Sigma_{c \in left\ col.} |c_2 - c_3 + c_1 - c_0|$.

In still another example, sample-adaptive weights can be applied to the aforementioned cost functions. The assigned weight values (e.g., power-of-2) are managed in ascending order from top rows to bottom rows for left template block and in ascending order from left to right columns for above template block. In addition, the weight values can be further tuned based on the distance of a sample toward the current block. For example, a relatively higher weight value is assigned to samples that are closer to the current block. The respective modifications of the above cost functions are:

$$\text{cost}'_1 = \sum_{r \in top\ row} w(r_2)^* |2r_1 - r_2 - r_0| + \sum_{c \in left\ col.} w(c_2)^* |2c_1 - c_2 - c_0|;$$

$$\text{cost}'_2 = \sum_{r \in top\ row} w(r_3)^* |2r_2 - r_3 - r_1| + \sum_{c \in left\ col.} w(c_2)^* |2c_2 - c_3 - c_1|;$$

$$\text{cost}'_3 = \sum_{r \in top\ row} |w(r_3)^*(2r_2 - r_3 - r_1) - w(r_2)^*(|2r_1 - r_2 - r_0)| +$$
$$\sum_{c \in left\ col.} |w(c_3)^*(2c_2 - c_3 - c_1) - w(c_2)^*(2c_1 - c_2 - c_0)|;$$

$$\text{cost}'_4 = \sum_{r \in top\ row} |w(r_3)^*(2r_2 - r_3 - r_1) + w(r_2)^*(|2r_1 - r_2 - r_0)| +$$
$$\sum_{c \in left\ col.} |w(c_3)^*(2c_2 - c_3 - c_1) - w(c_2)^*(2c_1 - c_2 - c_0)|,$$

In the above examples, where w(•) is the sample-adaptive weight function with $w(r_3) \geq w(r_2)$ and $w(c_3) \leq w(c_2)$ for all possible r of top row and c of left columns and a w(•) with a vector (e.g., r or c) of samples located closer to top-left corner of the current block is assigned with a weight value relatively lower than (or equal to) that of another w(•) with another r or c located further away from top-left corner of the current block.

In still another example, for the MV derivation (search), video decoder 300 may add a regularization term on top of one the above-described cost function. Video decoder 300 may calculate the regularization term depending on the difference between candidate MV and the initial MV. For instance, as described above, there may be an initial motion vector for current block 1200 that defines the search space. Motion vector 1206A and motion vector 1206B may be considered as candidate motion vectors. The regularization term may be larger for motion vectors with larger difference from the initial motion vector, and smaller for motion vectors with smaller difference from the initial motion vector. For instance, the regularization term increases the cost for a MV candidate that is far away from the initial MV. The regularization term may also be called MVD cost in BM and TM.

The following describes application in a decoder side MV derivation. In one application, the techniques may be used as an alternative TM refinement method, wherein the TM block matching cost is replaced by one of the costs described above for the "cost function design." Examples of the alternative TM refinement method are illustrated in FIGS. 14A and 14B, with example results in FIGS. 15 and 16.

Figures 14A, 14B:
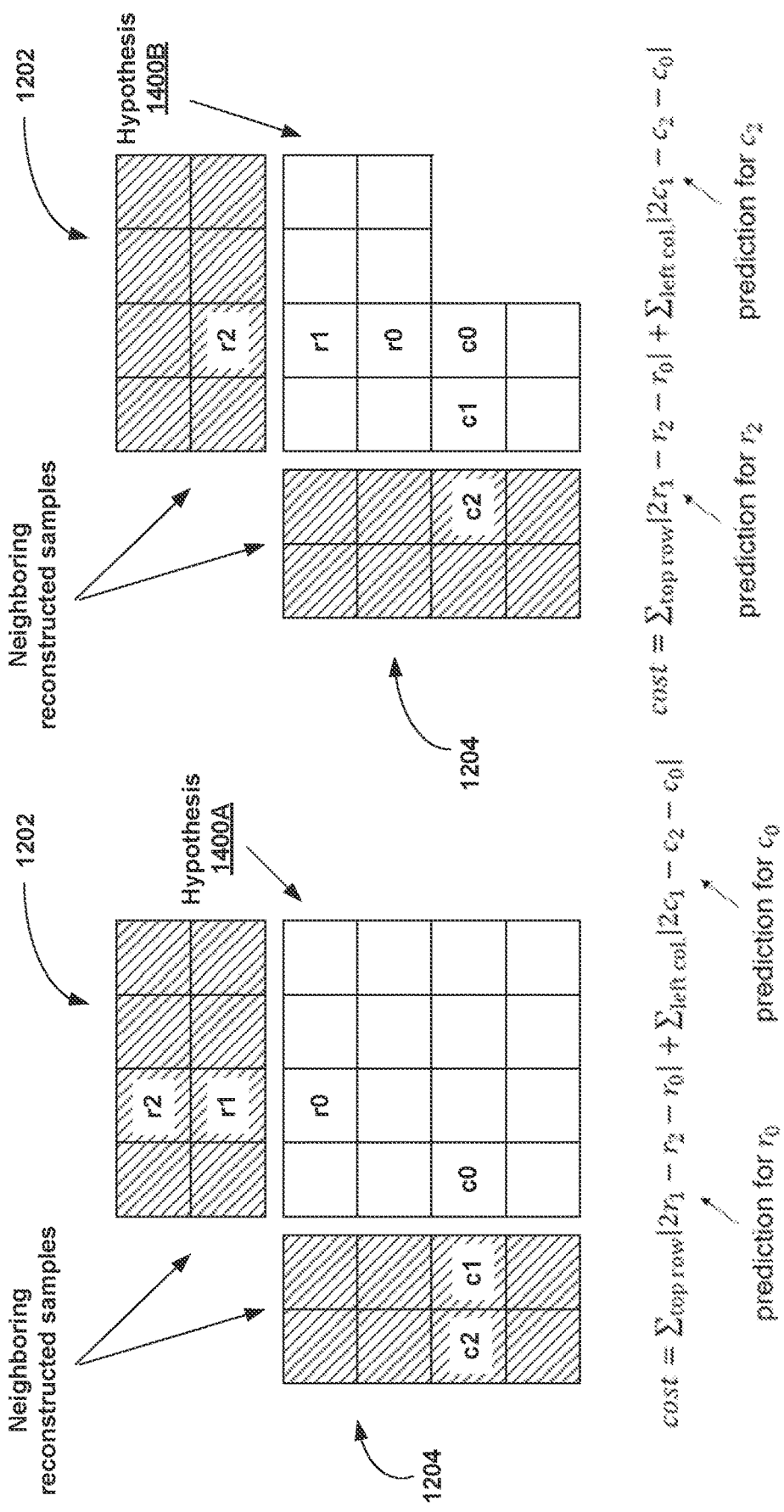
FIGS. 14A and 14B are conceptual diagrams illustrating alternative template matching.

For example, FIGS. 14 and 14B may be similar to the example illustrated in FIG. 13. However, in FIG. 14A, hypothesis 1400A may be a hypothesis of a reconstructed current block. For instance, to determine a plurality of hypotheses of the reconstructed current block, video decoder 3000 may determine a plurality of samples, where each of the plurality of motion vectors 1206 identifies a respective set of samples of the plurality of samples. The set of samples may be based on samples in a reference picture. For example, motion vector 1206A may identify a respective set of samples in reference picture 1210 of where hypothesis 1208A is located. It should be understood that for hypotheses of the reconstructed current block, hypothesis 1208A is not the actual hypothesis, but instead represents the plurality of samples that are used to generate the hypothesis of the reconstructed current block. Video decoder 300 may determine residual values for the current block (e.g., based on signaling from video encoder 200). These residual values may be the difference between the actual prediction block that video decoder 300 will use and the current block (e.g., current block 1200). Video decoder 300 may add the residual values and the plurality of samples to generate one of the plurality of hypotheses of the reconstructed block. Video decoder 300 may repeat these operations with motion vector 1206B to generate another one of the plurality of hypotheses of the reconstructed block.

FIG. 14A illustrates the samples from hypothesis 1400A and samples from neighboring samples (e.g., above samples 1202 and left samples 1204) for determining the correlation value (e.g., cost). One example of the equation for the cost (e.g., correlation value) is included in FIG. 14A.

The example of FIG. 14B may be similar to that of FIG. 13, and hypothesis 1400B may be one of hypothesis 1208A or hypothesis 1208B. For instance, hypothesis 1400B may be a hypothesis of a prediction block. To determine the plurality of hypotheses of the prediction block, video decoder 300 may determine each of the plurality of hypotheses of the prediction block based on samples identified by each of the motion vectors (e.g., motion vectors 1206A and 1206B) associated with each of the plurality of hypotheses (e.g., hypotheses 1208A and 1208B) of the prediction block.

FIG. 14B illustrates the samples from hypothesis 1400B and samples from neighboring samples (e.g., above samples 1202 and left samples 1204) for determining the correlation value (e.g., cost). One example of the equation for the cost (e.g., correlation value) is included in FIG. 14B.

In one example, one flag is signaled at sequence, picture, subpicture, slice, tile, CTU, coding unit or prediction unit level to indicate whether the original TM or the alternative TM is used to refine the selected merge candidate. The merge candidates list construction, merge index signaling et al of the alternative TM merge mode can be the same as those of original TM merge mode.

In another example, the choice of the cost function (e.g., which equation to use for determining the correlation value) can be implicitly selected. The choice of the cost function can be done for example by analyzing the neighbor sample and/or the current block samples, for example how uniform or different they are. For example, the average and/or variance of the neighbor samples and the current block samples and the conclusion of which cost function should be used. In another example, the cost functions (e.g., cost functions of different types) can be used together to refine motion vectors.

In another example, the MV candidates, for example merge candidates, refined by the alternative TM method are inserted in the TM merge candidates list. In one example, all the alternative TM merge candidates can be inserted after or before the original TM merge candidates. In another example, the alternative TM merge candidates can be inserted such that they are interleaved with original TM merge candidates, reordering methods can be applied to those candidates.

In still another example, the alternative TM refine method is used to derive additional MVP, for example in the inter AMVP mode, wherein the alternative TM refinement method instead of the original TM method is used to refine the selected MVP. MVP index can be signaled to indicate the new MVP.

In another example, the cost calculation proposed in this disclosure can be used together with other measures. For example, a linear combination of the proposed cost and original TM cost with predefined or adaptive weighting parameters applied.

In still another example, the alternative TM refinement method can be used as an additional refinement process to the TM or BM method, either before or after.

The following describes application in MV predictor reordering. The example techniques may be used to reorder a list of MV predictors (MVP), either the MVP in AMVP mode or merge candidates. In one example, the proposed cost function (described in "cost function design") may be used as the criterion for reordering of the MVPs.

In another example, the proposed cost calculation (e.g., "cost function design") may be used together with other measures for reordering of the MVPs. For example, a combination of the proposed cost and original TM cost may be used as the criterion. The combination can be a linear combination of the proposed cost and original TM cost with predefined or adaptive weighting parameters applied.

In another example, a maximum tolerance term T is introduced to the comparison process of MV predictor reordering to prevent applying swapping to MV candidates with similar cost values. Specifically, in the comparison process of reordering, this embodiment performs candidate index swapping on two MV candidates only when T plus the cost value of the MV candidate with a larger candidate index happens to be lower than the cost value of the other MV candidate with a smaller candidate index. The value of T can be derived through a function of CU size, such as "(CU size*n)/4". Typical configurations for this n could be 1, 2, 3, 4, 5, 6 and so on. In another embodiment, the T can be derived by using "(CU size*n)/N", where typical configurations of this N could be 1, 2, 3, 4 and so on. The respective values of n and N can be pre-defined or signaled in one or some of sequence/picture/subpicture/tile/slice/CTU levels.

The following describes application in MVD (motion vector difference) sign prediction. The example techniques may be used to predict or assign likelihood to the signs of MVD. Given the magnitude of MVD, there are multiple hypothesis of MVD based on different combination of signs of the x and y components. The proposed cost (e.g., "cost function design") can be calculated for each of the hypothesis and be used as a measure of the likelihood of the signs. For example, smaller cost means higher likelihood. Therefore, some binarization method can be applied to code the index of the hypothesis, wherein a hypothesis with more likelihood is assigned with a small index. For example, truncated unary code may be used to code the index of the hypotheses in the ascending order of the cost.

Figure 2:
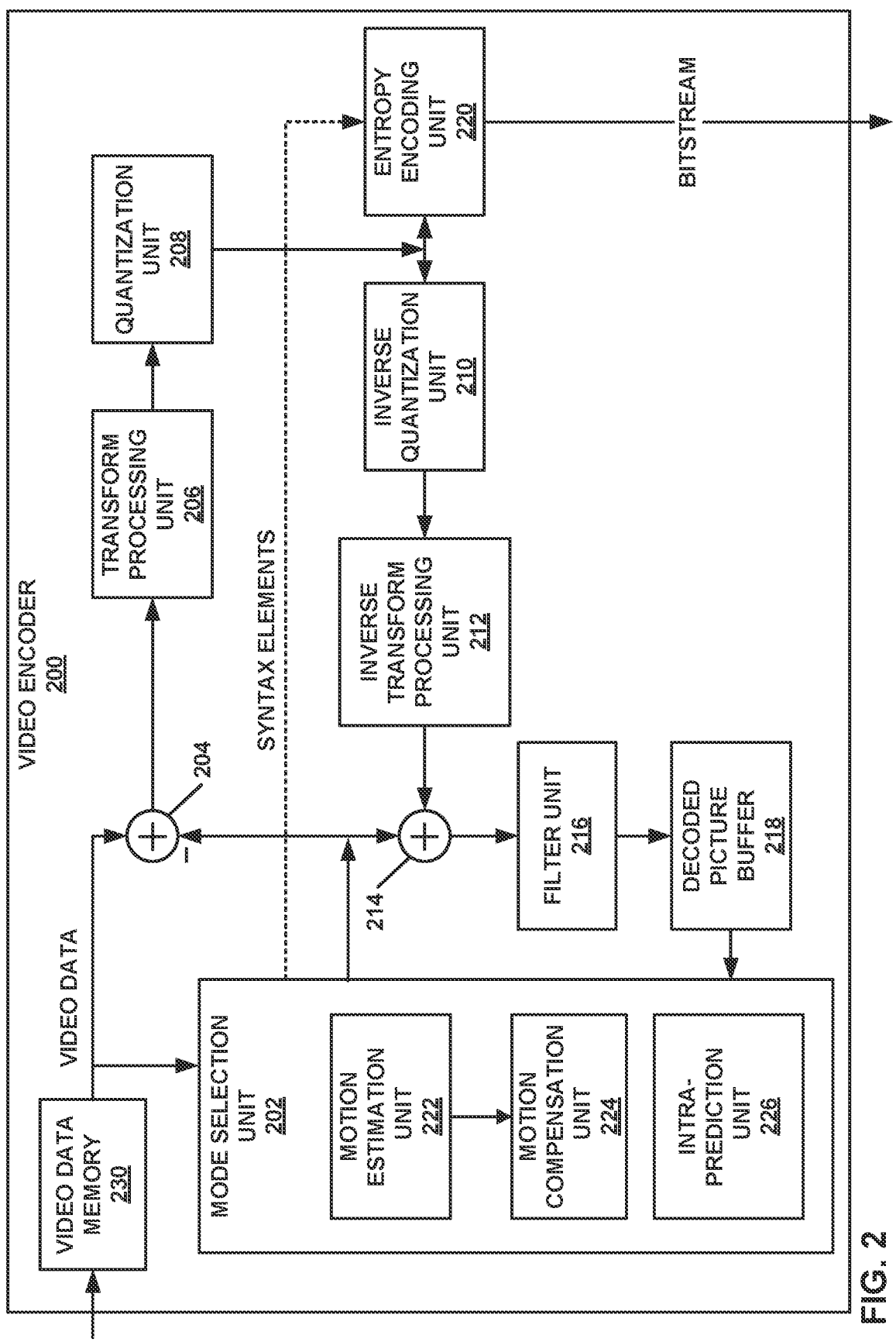
FIG. 2 is a block diagram illustrating an example video encoder that may perform the techniques of this disclosure.

FIG. 2 is a block diagram illustrating an example video encoder 200 that may perform the techniques of this disclosure. FIG. 2 is provided for purposes of explanation and should not be considered limiting of the techniques as broadly exemplified and described in this disclosure. For purposes of explanation, this disclosure describes video encoder 200 according to the techniques of VVC (ITU-T H.266, under development), and HEVC (ITU-T H.265). However, the techniques of this disclosure may be performed by video encoding devices that are configured to other video coding standards and video coding formats, such as AV1 and successors to the AV1 video coding format.

In the example of FIG. 2, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 2 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure. superblock structure, or the quadtree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 22 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to determine a spatial correlation of a sample of a current block, determine one or more motion vectors based on a decoder side motion vector derivation that utilizes the spatial correlation, and code the current block based on the one or more motion vectors. The spatial correlation of a sample may be based on the sample of the current block in a picture and samples within the same picture. The spatial correlation may be determined using the "cost design function" as described above, as one example.

In some examples, to determine the one or more motion vectors based on the decoder side motion vector derivation that utilizes the spatial correlation, video encoder 200 may be configured to determine the one or more motion vectors or likelihood to the one or more motion vectors based on a determined cost. The cost is calculated based on at least one sample from a hypothesis of the current block and at least one sample from a neighboring block. The at least one sample from the neighboring block is a reconstructed sample of the neighboring block or is a predicted sample of the neighboring block. In some examples, the hypothesis of the current block is a hypothesis of a reconstructed version of the current block or a hypothesis of a prediction block.

To determine the one or more motion vectors based on the decoder side motion vector derivation that utilizes the spatial correlation, video encoder 200 may determine an initial motion vector, determine one or more costs of motion vectors in a search area based on the initial motion vector, and determine the one or more motion vectors based on the determined one or more costs. For example, determining the one or more motion vectors based on the determined one or more costs may include determining the one or more motion vectors based on a minimum of the determined one or more costs. As another example, determining the one or more motion vectors based on the determined one or more costs may include constructing a list of motion vectors based on the determined one or more costs, wherein motion vectors having lower costs are associated with smaller indices in the list of motion vectors, and determining the one or motion vectors based on the list of motion vectors.

In some examples, video encoder 200 may be configured to determine one or more costs of motion vectors for decoder side motion vector derivation based on at least one sample from a hypothesis of a current block and at least one sample from a neighboring block, determine one or more motion vectors by performing template matching decoder side motion vector derivation based on the determined one or more costs, and code the current bock based on the one or more motion vectors. The coding of the current block may include adding the one or more motion vectors to a template matching merge candidate list.

In some examples, video encoder 200 may be configured to determine one or more costs of motion vectors based on spatial correlation of a sample of a current block, reorder a list of motion vector predictors based on the determined one or more costs, and code the current block based on the reordered list. In some examples, video encoder 200 may be configured to determine one or more costs of motion vectors based on based on spatial correlation of a sample of a current block, and context-based code a sign for a motion vector difference based on the determined one or more costs.

In general, although one or more of the above example techniques are described with respect to video decoder 300, video encoder 200 may perform similar functions. For instance, video encoder 200 may determine a plurality of hypotheses of a current block based on a plurality of motion vectors (e.g., within a search area defined by an initial motion vector for the current block). In one or more examples, each of the plurality of motion vectors is associated with one of the plurality of hypotheses of the current block, and each of the plurality of hypotheses of the current block is based on a set of samples in a reference picture for determining a motion vector for the current block, and respective motion vectors associated with respective hypotheses of the current block identify a top-left sample of the set of samples.

Video encoder 200 may determine one or more neighboring samples that are proximate to samples of the current block and in the same picture as the current block. For each of the plurality of hypotheses of the current block, video encoder 200 may determine respective correlation values between at least one sample of a respective hypothesis of the current block and at least one sample of the one or more neighboring samples. Video encoder 200 may determine a motion vector for the current block based on the determined respective correlation values. The motion vector may identify a set of samples, and video encoder 200 may generate a prediction block based on the set of samples. Video encoder 200 may determine a residual between the prediction block and the current block, and signal information indicative of the residual.

Figure 3:
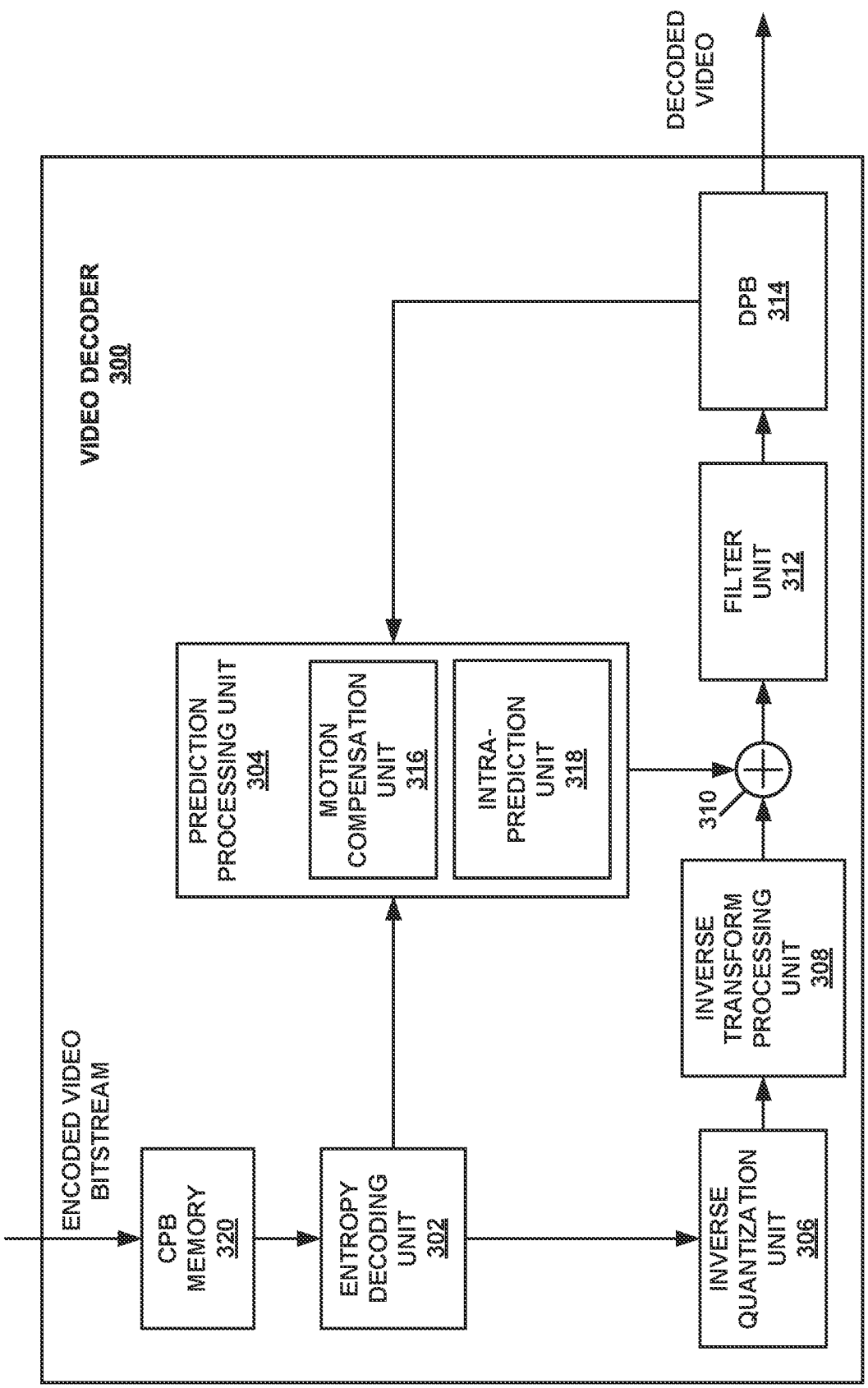
FIG. 3 is a block diagram illustrating an example video decoder that may perform the techniques of this disclosure.

FIG. 3 is a block diagram illustrating an example video decoder 300 that may perform the techniques of this disclosure. FIG. 3 is provided for purposes of explanation and is not limiting on the techniques as broadly exemplified and described in this disclosure. For purposes of explanation, this disclosure describes video decoder 300 according to the techniques of VVC (ITU-T H.266, under development), and HEVC (ITU-T H.265). However, the techniques of this disclosure may be performed by video coding devices that are configured to other video coding standards.

In the example of FIG. 3, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, compensation unit 316 may be configured to decode coding blocks of video data (e.g., both luma and chroma coding blocks) using translational motion compensation, affine motion compensation, OBMC, and/or compound inter-intra prediction, as described above. Intra prediction unit 318 may be configured to decode coding blocks of video data (e.g., both luma and chroma coding blocks) using directional intra prediction, non-directional intra prediction, recursive filter intra prediction, CFL, intra block copy (IBC), and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 3 are illustrated to assist with understanding the operations performed by video decoder 300. The units may be implemented as fixed-function circuits, programmable circuits, or a combination thereof. Similar to FIG. 2, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 2).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 2). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to determine a spatial correlation of a sample of a current block, determine one or more motion vectors based on a decoder side motion vector derivation that utilizes the spatial correlation, and code the current block based on the one or more motion vectors. The spatial correlation of a sample may be based on the sample of the current block in a picture and samples within the same picture. The spatial correlation may be determined using the "cost design function" as described above, as one example.

In some examples, to determine the one or more motion vectors based on the decoder side motion vector derivation that utilizes the spatial correlation, video decoder 300 may be configured to determine the one or more motion vectors or likelihood to the one or more motion vectors based on a determined cost. The cost is calculated based on at least one sample from a hypothesis of the current block and at least one sample from a neighboring block. The at least one sample from the neighboring block is a reconstructed sample of the neighboring block or is a predicted sample of the neighboring block. In some examples, the hypothesis of the current block is a hypothesis of a reconstructed version of the current block or a hypothesis of a prediction block.

To determine the one or more motion vectors based on the decoder side motion vector derivation that utilizes the spatial correlation, video decoder 300 may determine an initial motion vector, determine one or more costs of motion vectors in a search area based on the initial motion vector, and determine the one or more motion vectors based on the determined one or more costs. For example, determining the one or more motion vectors based on the determined one or more costs may include determining the one or more motion vectors based on a minimum of the determined one or more costs. As another example, determining the one or more motion vectors based on the determined one or more costs may include constructing a list of motion vectors based on the determined one or more costs, wherein motion vectors having lower costs are associated with smaller indices in the list of motion vectors, and determining the one or motion vectors based on the list of motion vectors.

In some examples, video decoder 300 may be configured to determine one or more costs of motion vectors for decoder side motion vector derivation based on at least one sample from a hypothesis of a current block and at least one sample from a neighboring block, determine one or more motion vectors by performing template matching decoder side motion vector derivation based on the determined one or more costs, and code the current bock based on the one or more motion vectors. The coding of the current block may include adding the one or more motion vectors to a template matching merge candidate list.

In some examples, video decoder 300 may be configured to determine one or more costs of motion vectors based on spatial correlation of a sample of a current block, reorder a list of motion vector predictors based on the determined one or more costs, and code the current block based on the reordered list. In some examples, video decoder 300 may be configured to determine one or more costs of motion vectors based on based on spatial correlation of a sample of a current block, and context-based code a sign for a motion vector difference based on the determined one or more costs.

In one or more examples, video decoder 300 may determine a plurality of hypotheses 1208 of a current block 1200 based on a plurality of motion vectors 1206 (e.g., within a search area defined by an initial motion vector for the current block 1200). In one or more examples, each of the plurality of motion vectors 1206 is associated with one of the plurality of hypotheses 1208 of the current block 1200. Each of the plurality of hypotheses 1208 of the current block 1200 is based on a set of samples in a reference picture 1210 for determining a motion vector for the current block, and respective motion vectors 1206 associated with respective hypotheses 1208 of the current block 1200 identify a top-left sample of the set of samples.

Video decoder 300 may determine one or more neighboring samples that are proximate to samples of the current block and in the same picture as the current block (e.g., above samples 1202 and left samples 1204). For each of the plurality of hypotheses 1208 of the current block 1200, video decoder 300 may determine respective correlation values between at least one sample of a respective hypothesis (e.g., hypothesis 1208A and hypothesis 1208B) of the current block 1200 and at least one sample of the one or more neighboring samples (e.g., above samples 1202 and/or left samples 1204).

Video decoder 300 may determine a motion vector for the current block 1200 based on the determined respective correlation values. Video decoder 300 may reconstruct the current block 1200 based on the determined motion vector.

Figure 4:
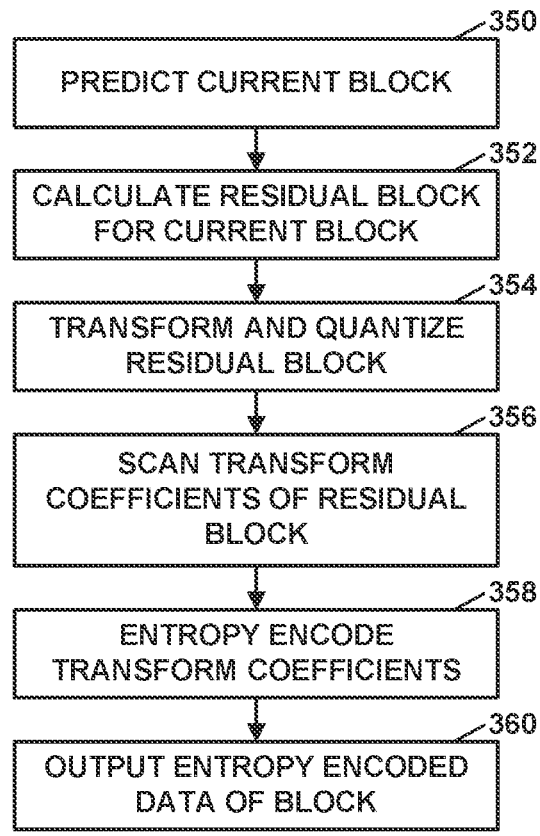
FIG. 4 is a flowchart illustrating an example method for encoding a current block in accordance with the techniques of this disclosure.

FIG. 4 is a flowchart illustrating an example method for encoding a current block in accordance with the techniques of this disclosure. The current block may comprise a current CU. Although described with respect to video encoder 200 (FIGS. 1 and 2), it should be understood that other devices may be configured to perform a method similar to that of FIG. 4.

In this example, video encoder 200 initially predicts the current block (350). For example, video encoder 200 may form a prediction block for the current block. Video encoder 200 may form the prediction block for the current block using the example techniques described in this disclosure, such as those that rely upon spatial correlation. Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 5:
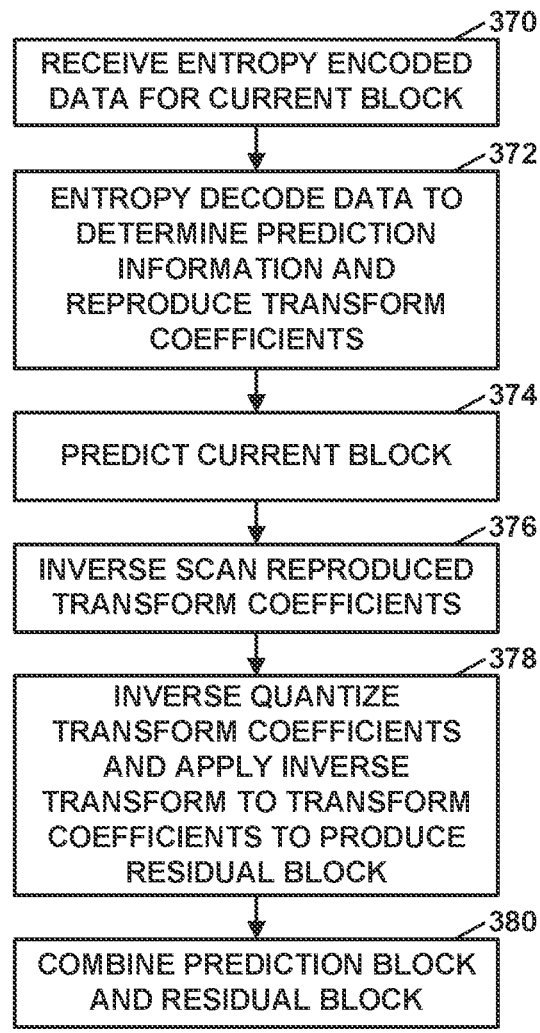
FIG. 5 is a flowchart illustrating an example method for decoding a current block in accordance with the techniques of this disclosure.

FIG. 5 is a flowchart illustrating an example method for decoding a current block of video data in accordance with the techniques of this disclosure. The current block may comprise a current CU. Although described with respect to video decoder 300 (FIGS. 1 and 3), it should be understood that other devices may be configured to perform a method similar to that of FIG. 5.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. Video decoder 300 may calculate the prediction block for the current block using the example techniques described in this disclosure, such as those that rely upon spatial correlation. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380).

Figure 17:
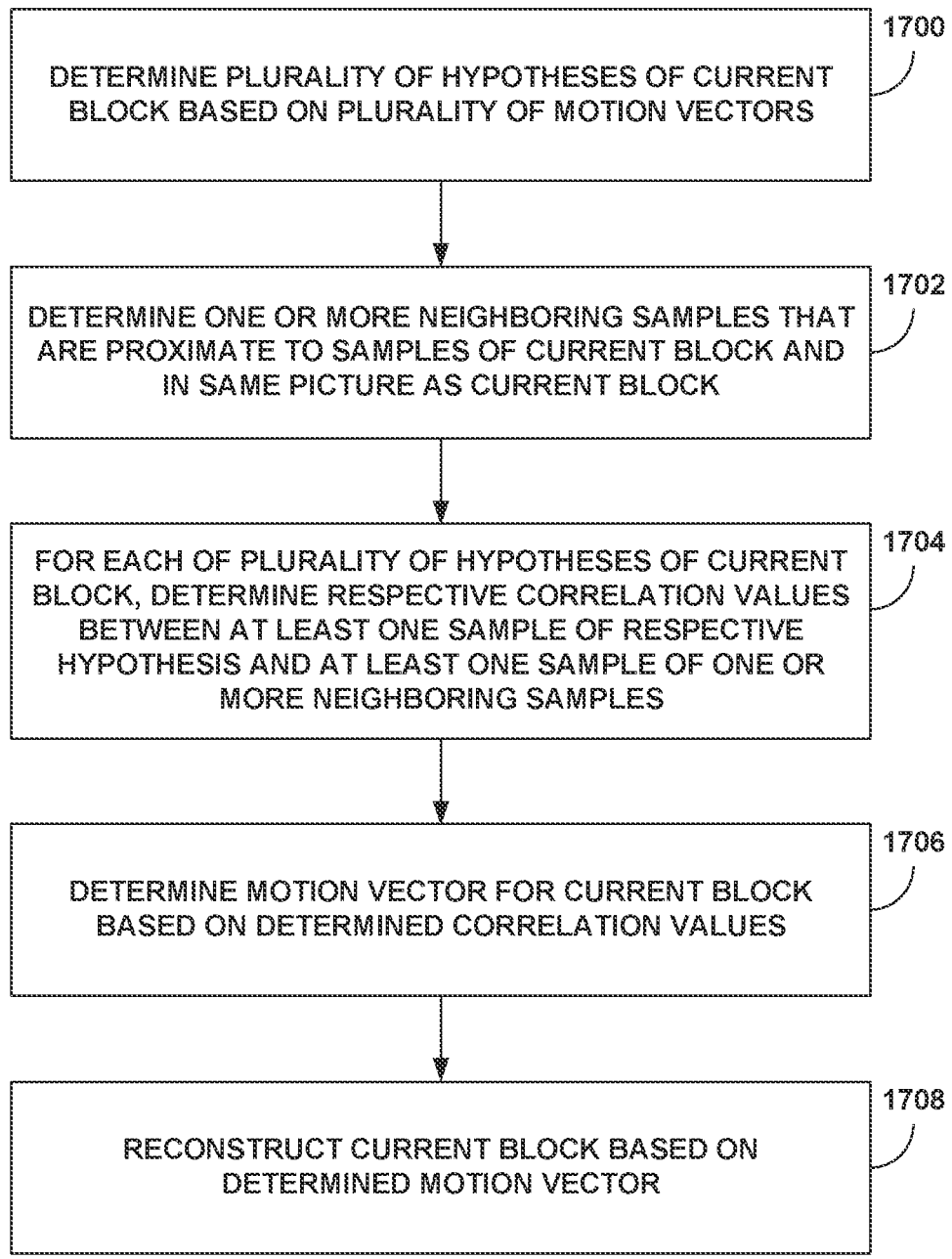
FIG. 17 is a flowchart illustrating example techniques to reconstruct a current block.

FIG. 17 is a flowchart illustrating example techniques to reconstruct a current block. For ease, reference is made to FIGS. 11, 12, 13, 14A, and 14B.

Video decoder 300 may determine a plurality of hypotheses 1208 of a current block 1200 based on a plurality of motion vectors 1206 (1700). As one example, the plurality of hypotheses 1208 may be within a search area defined by an initial motion vector for current block 1200. An example of the search area is illustrated in FIG. 11.

In one or more examples, each of the plurality of motion vectors 1206 is associated with one of the plurality of hypotheses 1208 of the current block 1200. For example, motion vector 1206A is associated with hypothesis 1208A, and motion vector 1206B is associated with hypothesis 1208B. Each of the plurality of hypotheses 1208 of the current block 1200 is based on a set of samples in reference picture 1210 for determining a motion vector for the current block, and respective motion vectors 1206 associated with respective hypotheses 1208 of the current block 1200 identify a top-left sample of the set of samples. For example, as illustrated in FIG. 12, motion vector 1206A identifies a top-left sample of the set of samples used to determine hypothesis 1208A, and motion vector 1206B identifies a top-left sample of the set of samples used to determine hypothesis 1208B.

There may be various ways in which video decoder 300 may determine the plurality of hypotheses 1208 of current block 1200. As one example, determining a plurality of hypotheses 1208 of a current block 1200 includes determining a plurality of hypotheses of a prediction block. To determine the plurality of hypotheses of the prediction block, video decoder 300 may determine each of the plurality of hypotheses of the prediction block based on samples identified by each of the motion vectors associated with each of the plurality of hypotheses of the prediction block. For instance, plurality of hypotheses of the prediction block include the actual samples from reference picture 1210.

As another example, determining a plurality of hypotheses 1208 of a current block 1200 includes determining a plurality of hypotheses of a reconstructed current block. A hypothesis of a reconstruct block may refer to a set of samples in reference picture 1210 that are summed with residual values that video encoder 200 signals. The result of the summing is the hypothesis of the reconstructed current block.

For instance, to determine the plurality of hypotheses of the reconstructed current block, video decoder 300 may be configured to determine a plurality of samples, where each of the plurality of motion vectors 1206 identifies a respective set of samples of the plurality of samples (e.g., in reference picture 1210). Video decoder 300 may determine residual values for the current block 1200 (e.g., based on information signaled by video encoder 200). Video decoder 300 may sum the residual values with each of the plurality of samples to generate respective ones of the plurality of hypotheses of the reconstructed current block.

Video decoder 300 may determine one or more neighboring samples that are proximate to samples of the current block 1200 and in the same picture as the current block 1200 (1702). For example, video decoder 300 may identify one or more of above samples 1202 and left samples 1204, which are both in the same picture as current block 1200. As an example, the one or more neighboring samples comprises at least a left neighboring sample and an above neighboring sample. The left neighboring sample is a sample in a column left of the current block, and the above neighboring sample is a sample in a row above the current block.

For each of the plurality of hypotheses 1208 of the current block 1200, video decoder 300 may determine respective correlation values between at least one sample of a respective hypothesis of the current block 1200 and at least one sample of the one or more neighboring samples (1704). For example, video decoder 300 may utilize the samples from hypothesis 1300, 1400A, or 1400B and samples from above samples 1202 and left samples 1204 as examples of samples for determine respective correlation values. Video decoder 300 may determine the correlation values (also referred to as cost or cost of MVs) using the above example equations. For instance, to determine the respective correlation values, video decoder 300 may determine an Nth-order derivative between the at least one sample of the respective hypotheses 1208 of the current block 1200 and the at least one of the one or more neighboring samples. As one example, the Nth-order derivative is a second order derivative (e.g., Laplacian).

Video decoder 300 may determine a motion vector for the current block 1200 based on the determined respective correlation values (1706). As one example, to determine the motion vector, video decoder 300 may determine a hypothesis of the current block from the plurality of hypotheses of the current block having a correlation value that indicates highest correlation (e.g., lowest cost) among the respective plurality of hypotheses 1208 of the current block 1200. Video decoder 300 may determine a motion vector for the determined hypothesis, and determine the motion vector for the current block based on the determined motion vector for the determined hypothesis.

As another example, to determine the motion vector, video decoder 300 may construct a list of motion vectors based on the determined respective correlation values for the plurality of hypotheses 1208 of the current block 1200. Video decoder 300 may determine an index into the list of motion vectors (e.g., based on signaling from video encoder 200 or possibly through inferential techniques without signaling). Video decoder 300 may determine the motion vector for the current block 1200 based on the index into the list of motion vectors.

Video decoder 300 may reconstruct the current block 1200 based on the determined motion vector (1708). For instance, video decoder 300 may determine a prediction block based on the determined motion vector. Video decoder 300 may determine residual values for the current block 1200 (e.g., based on signaling from video encoder 200). Video decoder 300 may sum the prediction block and the residual values to reconstruct the current block 1200.

The following describes example techniques of this disclosure that may be used separately or in any combination.

Clause 1: A method of coding video data includes determining a spatial correlation of a sample of a current block; determining one or more motion vectors based on a decoder side motion vector derivation that utilizes the spatial correlation; and coding the current block based on the one or more motion vectors.

Clause 2: The method of clause 1, wherein determining the one or more motion vectors based on the decoder side motion vector derivation that utilizes the spatial correlation comprises determining the one or more motion vectors or likelihood to the one or more motion vectors based on a determined cost.

Clause 3: The method of clause 2, wherein the cost is calculated based on at least one sample from a hypothesis of the current block and at least one sample from a neighboring block.

Clause 4: The method of clause 3, wherein the at least one sample from the neighboring block is a reconstructed sample of the neighboring block or is a predicted sample of the neighboring block.

Clause 5: The method of any of clauses 3 and 4, wherein the hypothesis of the current block is a hypothesis of a reconstructed version of the current block or a hypothesis of a prediction block.

Clause 6: The method of any of clauses 1-5, wherein determining the one or more motion vectors based on the decoder side motion vector derivation that utilizes the spatial correlation comprises: determining an initial motion vector; determining one or more costs of motion vectors in a search area based on the initial motion vector; and determining the one or more motion vectors based on the determined one or more costs.

Clause 7: The method of clause 6, wherein determining the one or more motion vectors based on the determined one or more costs comprises determining the one or more motion vectors based on a minimum of the determined one or more costs.

Clause 8: The method of clause 6, wherein determining the one or more motion vectors based on the determined one or more costs comprises: constructing a list of motion vectors based on the determined one or more costs, wherein motion vectors having lower costs are associated with smaller indices in the list of motion vectors; and determining the one or motion vectors based on the list of motion vectors.

Clause 9: A method of coding video data includes determining one or more costs of motion vectors for decoder side motion vector derivation based on at least one sample from a hypothesis of a current block and at least one sample from a neighboring block; determining one or more motion vectors by performing template matching decoder side motion vector derivation based on the determined one or more costs; and coding the current bock based on the one or more motion vectors.

Clause 10: The method of clause 9, wherein coding the current block comprises: adding the one or more motion vectors to a template matching merge candidate list.

Clause 11: A method of coding video data includes determining one or more costs of motion vectors based on spatial correlation of a sample of a current block; reordering a list of motion vector predictors based on the determined one or more costs; and coding the current block based on the reordered list.

Clause 12: A method of coding video data includes determining one or more costs of motion vectors based on based on spatial correlation of a sample of a current block; and context-based coding a sign for a motion vector difference based on the determined one or more costs.

Clause 13: The method of any of clauses 1-12, wherein the coding comprises decoding.

Clause 14: A device for coding video data includes memory configured to store the video data; and processing circuitry configured to perform the method of any one or combination of clauses 1-13.

Clause 15: The device of clause 14, further comprising a display configured to display decoded video data.

Clause 16: The device of any of clauses 14 and 15, wherein the device comprises one or more of a camera, a computer, a mobile device, a broadcast receiver device, or a set-top box.

Clause 17: The device of clause 14, wherein the device comprises a video decoder.

Clause 18: A device for coding video data, the device comprising means for performing the method of any of clauses 1-13.

Clause 19: A computer-readable storage medium storing instructions thereon that cause one or more processors to perform the method of any of clauses 1-13.

Clause 20: A method of coding video data includes determining a spatial correlation of a sample of a current block; determining one or more motion vectors based on a decoder side motion vector derivation that utilizes the spatial correlation; and coding the current block based on the one or more motion vectors.

Clause 21: The method of clause 20, wherein determining the one or more motion vectors based on the decoder side motion vector derivation that utilizes the spatial correlation comprises determining the one or more motion vectors or likelihood to the one or more motion vectors based on a determined cost.

Clause 22: The method of clause 21, wherein the cost is calculated based on at least one sample from a hypothesis of the current block and at least one sample from a neighboring block.

Clause 23: The method of clause 22, wherein the at least one sample from the neighboring block is a reconstructed sample of the neighboring block or is a predicted sample of the neighboring block.

Clause 24: The method of clause 22, wherein the hypothesis of the current block is a hypothesis of a reconstructed version of the current block or a hypothesis of a prediction block.

Clause 25: The method of clause 20, wherein determining the one or more motion vectors based on the decoder side motion vector derivation that utilizes the spatial correlation comprises: determining an initial motion vector; determining one or more costs of motion vectors in a search area based on the initial motion vector; and determining the one or more motion vectors based on the determined one or more costs.

Clause 26: The method of clause 25, wherein determining the one or more motion vectors based on the determined one or more costs comprises determining the one or more motion vectors based on a minimum of the determined one or more costs.

Clause 27: The method of clause 25, wherein determining the one or more motion vectors based on the determined one or more costs comprises: constructing a list of motion vectors based on the determined one or more costs, wherein motion vectors having lower costs are associated with smaller indices in the list of motion vectors; and determining the one or motion vectors based on the list of motion vectors.

Clause 28: A device of coding video data includes memory configured to store the video data; and processing circuitry configured to: determine a spatial correlation of a sample of a current block; determine one or more motion vectors based on a decoder side motion vector derivation that utilizes the spatial correlation; and code the current block based on the one or more motion vectors.

Clause 29: A device of coding video data includes memory configured to store the video data; and processing circuitry configured to: determine one or more costs of motion vectors for decoder side motion vector derivation based on at least one sample from a hypothesis of a current block and at least one sample from a neighboring block; determine one or more motion vectors by performing template matching decoder side motion vector derivation based on the determined one or more costs; and code the current bock based on the one or more motion vectors.

Clause 30: A device for coding video data includes memory configured to store the video data; and processing circuitry configured to: determine one or more costs of motion vectors based on spatial correlation of a sample of a current block; reorder a list of motion vector predictors based on the determined one or more costs; and code the current block based on the reordered list.

Clause 31: A device for coding video data includes a memory configured to store the video data; and processing circuitry configured to: determine one or more costs of motion vectors based on based on spatial correlation of a sample of a current block; and context-based code a sign for a motion vector difference based on the determined one or more costs.

Clause 32: A method of decoding video data, the method comprising: determining a plurality of hypotheses of a current block of the video data based on a plurality of motion vectors, wherein each of the plurality of motion vectors is associated with one of the plurality of hypotheses of the current block, wherein each of the plurality of hypotheses of the current block is based on a set of samples in a reference picture for determining a motion vector for the current block, and respective motion vectors associated with respective hypotheses of the current block identify a top-left sample of the set of samples; determining one or more neighboring samples that are proximate to samples of the current block and in the same picture as the current block; for each of the plurality of hypotheses of the current block, determining respective correlation values between at least one sample of a respective hypothesis of the current block and at least one sample of the one or more neighboring samples; determining the motion vector for the current block based on the determined respective correlation values; and reconstructing the current block based on the determined motion vector.

Clause 33: The method of clause 32, wherein determining the motion vector comprises: constructing a list of motion vectors based on the determined respective correlation values for the plurality of hypotheses of the current block; determining an index into the list of motion vectors; and determining the motion vector for the current block based on the index into the list of motion vectors.

Clause 34: The method of clause 32, wherein determining the motion vector comprises: determining a hypothesis of the current block from the plurality of hypotheses of the current block having a correlation value that indicates a highest correlation among the respective plurality of hypotheses of the current block; determining a motion vector for the determined hypothesis; and determining the motion vector for the current block based on the determined motion vector for the determined hypothesis.

Clause 35: The method of any of clauses 32-34, wherein determining the plurality of hypotheses of the current block comprises determining the plurality of hypotheses of a prediction block, wherein determining the plurality of hypotheses of the prediction block comprises determining each of the plurality of hypotheses of the prediction block based on samples identified by each of the motion vectors associated with each of the plurality of hypotheses of the prediction block.

Clause 36: The method of any of clauses 32-34, wherein determining the plurality of hypotheses of the current block comprises determining the plurality of hypotheses of a reconstructed current block, wherein determining the plurality of hypotheses of the reconstructed current block comprises: determining a plurality of samples, wherein each of the plurality of motion vectors identifies a respective set of samples of the plurality of samples; determining residual values for the current block; and summing the residual values with each of the plurality of samples to generate respective ones of the plurality of hypotheses of the reconstructed current block.

Clause 37: The method of any of clauses 32-36, wherein determining the respective correlation values comprises determining an Nth-order derivative between the at least one sample of the respective hypotheses of the current block and the at least one of the one or more neighboring samples.

Clause 38: The method of clause 37, wherein the Nth-order derivative is a second order derivative.

Clause 39: The method of any of clauses 32-38, wherein the one or more neighboring samples comprises at least a left neighboring sample and an above neighboring sample, wherein the left neighboring sample is a sample in a column left of the current block, and the above neighboring sample is a sample in a row above the current block.

Clause 40: The method of any of clauses 32-39, wherein reconstructing the current block based on the determined motion vector comprises: determining a prediction block based on the determined motion vector; determining residual values for the current block; and summing the prediction block and the residual values to reconstruct the current block.

Clause 41: A device for decoding video data, the device comprising: memory configured to store the video data; and processing circuitry coupled to the memory and configured to: determine a plurality of hypotheses of a current block of the video data based on a plurality of motion vectors, wherein each of the plurality of motion vectors is associated with one of the plurality of hypotheses of the current block, wherein each of the plurality of hypotheses of the current block is based on a set of samples in a reference picture for determining a motion vector for the current block, and respective motion vectors associated with respective hypotheses of the current block identify a top-left sample of the set of samples; determine one or more neighboring samples that are proximate to samples of the current block and in the same picture as the current block; for each of the plurality of hypotheses of the current block, determine respective correlation values between at least one sample of a respective hypothesis of the current block and at least one sample of the one or more neighboring samples; determine the motion vector for the current block based on the determined respective correlation values; and reconstruct the current block based on the determined motion vector.

Clause 42: The device of clause 41, wherein to determine the motion vector, the processing circuitry is configured to comprises: construct a list of motion vectors based on the determined respective correlation values for the plurality of hypotheses of the current block; determine an index into the list of motion vectors; and determine the motion vector for the current block based on the index into the list of motion vectors.

Clause 43: The device of clause 41, wherein to determine the motion vector, the processing circuitry is configured to: determine a hypothesis of the current block from the plurality of hypotheses of the current block having a correlation value that indicates a highest correlation among the respective plurality of hypotheses of the current block; determine a motion vector for the determined hypothesis; and determine the motion vector for the current block based on the determined motion vector for the determined hypothesis.

Clause 44: The device of any of clauses 41-43, wherein to determine the plurality of hypotheses of the current block, the processing circuitry is configured to determine the plurality of hypotheses of a prediction block, wherein to determine the plurality of hypotheses of the prediction block, the processing circuitry is configured to determine each of the plurality of hypotheses of the prediction block based on samples identified by each of the motion vectors associated with each of the plurality of hypotheses of the prediction block.

Clause 45: The device of any of clauses 41-43, wherein to determine the plurality of hypotheses of the current block, the processing circuitry is configured to determine the plurality of hypotheses of a reconstructed current block, and wherein to determine the plurality of hypotheses of the reconstructed current block, the processing circuitry is configured to: determine a plurality of samples, wherein each of the plurality of motion vectors identifies a respective set of samples of the plurality of samples; determine residual values for the current block; and sum the residual values with each of the plurality of samples to generate respective ones of the plurality of hypotheses of the reconstructed current block.

Clause 46: The device of any of clauses 41-45, wherein to determine the respective correlation values comprises determining an Nth-order derivative between the at least one sample of the respective hypotheses of the current block and the at least one of the one or more neighboring samples.

Clause 47: The device of clause 46, wherein the Nth-order derivative is a second order derivative.

Clause 48: The device of any of clauses 41-47, wherein the one or more neighboring samples comprises at least a left neighboring sample and an above neighboring sample, wherein the left neighboring sample is a sample in a column left of the current block, and the above neighboring sample is a sample in a row above the current block.

Clause 49: The device of any of clauses 41-48, wherein to reconstruct the current block based on the determined motion vector, the processing circuitry is configured to: determine a prediction block based on the determined motion vector; determine residual values for the current block; and sum the prediction block and the residual values to reconstruct the current block.

Clause 50: The device of any of clauses 41-49, further comprising a display configured to display the reconstructed current block.

Clause 51: The device of any of clauses 41-50, wherein the device comprises one or more of a camera, a computer, a mobile device, a broadcast receiver device, or a set-top box.

Clause 52: A computer-readable storage medium storing instructions thereon that when executed cause one or more processors to: determine a plurality of hypotheses of a current block of video data based on a plurality of motion vectors, wherein each of the plurality of motion vectors is associated with one of the plurality of hypotheses of the current block, wherein each of the plurality of hypotheses of the current block is based on a set of samples in a reference picture for determining a motion vector for the current block, and respective motion vectors associated with respective hypotheses of the current block identify a top-left sample of the set of samples; determine one or more neighboring samples that are proximate to samples of the current block and in the same picture as the current block; for each of the plurality of hypotheses of the current block, determine respective correlation values between at least one sample of a respective hypothesis of the current block and at least one sample of the one or more neighboring samples; determine the motion vector for the current block based on the determined respective correlation values; and reconstruct the current block based on the determined motion vector.

Clause 53: The computer-readable storage medium of clause 52, further comprising instructions that cause the one or more processors to perform the method of any one or combination of clauses 32-40.

Clause 54: A device for decoding video data, the device comprising: means for determining a plurality of hypotheses of a current block of the video data based on a plurality of motion vectors, wherein each of the plurality of motion vectors is associated with one of the plurality of hypotheses of the current block, wherein each of the plurality of hypotheses of the current block is based on a set of samples in a reference picture for determining a motion vector for the current block, and respective motion vectors associated with respective hypotheses of the current block identify a top-left sample of the set of samples; means for determining one or more neighboring samples that are proximate to samples of the current block and in the same picture as the current block; for each of the plurality of hypotheses of the current block, means for determining respective correlation values between at least one sample of a respective hypothesis of the current block and at least one sample of the one or more neighboring samples; means for determining the motion vector for the current block based on the determined respective correlation values; and means for reconstructing the current block based on the determined motion vector.

Clause 55: The device of clause 54, further comprising means for performing the method of any one or combination of clauses 42-40.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining a plurality of hypotheses of a current block of the video data based on a plurality of motion vectors, wherein each of the plurality of motion vectors is associated with one of the plurality of hypotheses of the current block, wherein each of the plurality of hypotheses of the current block is based on a set of samples in a reference picture for determining a motion vector for the current block, wherein respective motion vectors associated with respective hypotheses of the current block identify a top-left sample of the set of samples, and wherein each of the plurality of hypotheses has a same shape as the current block;
   determining one or more neighboring samples that are proximate to samples of the current block and in the same picture as the current block;
   for each of the plurality of hypotheses of the current block, determining respective correlation values between at least one sample of a respective hypothesis of the current block and at least one sample of the one or more neighboring samples;

determining the motion vector for the current block based on the determined respective correlation values; and reconstructing the current block based on the determined motion vector.

2. The method of claim 1, wherein determining the motion vector comprises:
constructing a list of motion vectors based on the determined respective correlation values for the plurality of hypotheses of the current block;
determining an index into the list of motion vectors; and
determining the motion vector for the current block based on the index into the list of motion vectors.

3. The method of claim 1, wherein determining the motion vector comprises:
determining a hypothesis of the current block from the plurality of hypotheses of the current block having a correlation value that indicates a highest correlation among the respective plurality of hypotheses of the current block;
determining a motion vector for the determined hypothesis; and
determining the motion vector for the current block based on the determined motion vector for the determined hypothesis.

4. The method of claim 1, wherein determining the plurality of hypotheses of the current block comprises determining the plurality of hypotheses of a prediction block, wherein determining the plurality of hypotheses of the prediction block comprises determining each of the plurality of hypotheses of the prediction block based on samples identified by each of the motion vectors associated with each of the plurality of hypotheses of the prediction block.

5. The method of claim 1, wherein determining the plurality of hypotheses of the current block comprises determining the plurality of hypotheses of a reconstructed current block, wherein determining the plurality of hypotheses of the reconstructed current block comprises:
determining a plurality of samples, wherein each of the plurality of motion vectors identifies a respective set of samples of the plurality of samples;
determining residual values for the current block; and
summing the residual values with each of the plurality of samples to generate respective ones of the plurality of hypotheses of the reconstructed current block.

6. The method of claim 1, wherein determining the respective correlation values comprises determining an Nth-order derivative between the at least one sample of the respective hypotheses of the current block and the at least one of the one or more neighboring samples.

7. The method of claim 6, wherein the Nth-order derivative is a second order derivative.

8. The method of claim 1, wherein the one or more neighboring samples comprises at least a left neighboring sample and an above neighboring sample, wherein the left neighboring sample is a sample in a column left of the current block, and the above neighboring sample is a sample in a row above the current block.

9. The method of claim 1, wherein reconstructing the current block based on the determined motion vector comprises:
determining a prediction block based on the determined motion vector;
determining residual values for the current block; and
summing the prediction block and the residual values to reconstruct the current block.

10. A device for decoding video data, the device comprising:
memory configured to store the video data; and
processing circuitry coupled to the memory and configured to:
determine a plurality of hypotheses of a current block of the video data based on a plurality of motion vectors, wherein each of the plurality of motion vectors is associated with one of the plurality of hypotheses of the current block, wherein each of the plurality of hypotheses of the current block is based on a set of samples in a reference picture for determining a motion vector for the current block, wherein respective motion vectors associated with respective hypotheses of the current block identify a top-left sample of the set of samples, wherein each of the plurality of hypotheses has a same shape of the current block;
determine one or more neighboring samples that are proximate to samples of the current block and in the same picture as the current block;
for each of the plurality of hypotheses of the current block, determine respective correlation values between at least one sample of a respective hypothesis of the current block and at least one sample of the one or more neighboring samples;
determine the motion vector for the current block based on the determined respective correlation values; and
reconstruct the current block based on the determined motion vector.

11. The device of claim 10, wherein to determine the motion vector, the processing circuitry is configured to comprises:
construct a list of motion vectors based on the determined respective correlation values for the plurality of hypotheses of the current block;
determine an index into the list of motion vectors; and
determine the motion vector for the current block based on the index into the list of motion vectors.

12. The device of claim 10, wherein to determine the motion vector, the processing circuitry is configured to:
determine a hypothesis of the current block from the plurality of hypotheses of the current block having a correlation value that indicates a highest correlation among the respective plurality of hypotheses of the current block;
determine a motion vector for the determined hypothesis; and
determine the motion vector for the current block based on the determined motion vector for the determined hypothesis.

13. The device of claim 10, wherein to determine the plurality of hypotheses of the current block, the processing circuitry is configured to determine the plurality of hypotheses of a prediction block, wherein to determine the plurality of hypotheses of the prediction block, the processing circuitry is configured to determine each of the plurality of hypotheses of the prediction block based on samples identified by each of the motion vectors associated with each of the plurality of hypotheses of the prediction block.

14. The device of claim 10, wherein to determine the plurality of hypotheses of the current block, the processing circuitry is configured to determine the plurality of hypotheses of a reconstructed current block, and wherein to determine the plurality of hypotheses of the reconstructed current block, the processing circuitry is configured to:
- determine a plurality of samples, wherein each of the plurality of motion vectors identifies a respective set of samples of the plurality of samples;
- determine residual values for the current block; and
- sum the residual values with each of the plurality of samples to generate respective ones of the plurality of hypotheses of the reconstructed current block.

15. The device of claim 10, wherein to determine the respective correlation values, the processing circuitry is configured to determine an Nth-order derivative between the at least one sample of the respective hypotheses of the current block and the at least one of the one or more neighboring samples.

16. The device of claim 15, wherein the Nth-order derivative is a second order derivative.

17. The device of claim 10, wherein the one or more neighboring samples comprises at least a left neighboring sample and an above neighboring sample, wherein the left neighboring sample is a sample in a column left of the current block, and the above neighboring sample is a sample in a row above the current block.

18. The device of claim 10, wherein to reconstruct the current block based on the determined motion vector, the processing circuitry is configured to:
- determine a prediction block based on the determined motion vector;
- determine residual values for the current block; and
- sum the prediction block and the residual values to reconstruct the current block.

19. The device of claim 10, further comprising a display configured to display the reconstructed current block.

20. The device of claim 10, wherein the device comprises one or more of a camera, a computer, a mobile device, a broadcast receiver device, or a set-top box.

21. A method of decoding video data, the method comprising:
- determining a plurality of hypotheses of a current block of the video data based on a plurality of motion vectors, wherein each of the plurality of motion vectors is associated with one of the plurality of hypotheses of the current block, wherein each of the plurality of hypotheses of the current block is based on a set of samples in a reference picture for determining a motion vector for the current block, and respective motion vectors associated with respective hypotheses of the current block identify a top-left sample of the set of samples;
- determining one or more neighboring samples that are proximate to samples of the current block and in the same picture as the current block;
- for each of the plurality of hypotheses of the current block, determining respective correlation values between at least one sample of a respective hypothesis of the current block and at least one sample of the one or more neighboring samples, wherein determining the respective correlation values comprises determining an Nth-order derivative between the at least one sample of the respective hypotheses of the current block and the at least one of the one or more neighboring samples;
- determining the motion vector for the current block based on the determined respective correlation values; and
- reconstructing the current block based on the determined motion vector.

22. A device for decoding video data, the device comprising:
- memory configured to store the video data; and
- processing circuitry coupled to the memory and configured to:
  - determine a plurality of hypotheses of a current block of the video data based on a plurality of motion vectors, wherein each of the plurality of motion vectors is associated with one of the plurality of hypotheses of the current block, wherein each of the plurality of hypotheses of the current block is based on a set of samples in a reference picture for determining a motion vector for the current block, and wherein respective motion vectors associated with respective hypotheses of the current block identify a top-left sample of the set of samples;
  - determine one or more neighboring samples that are proximate to samples of the current block and in the same picture as the current block;
  - for each of the plurality of hypotheses of the current block, determine respective correlation values between at least one sample of a respective hypothesis of the current block and at least one sample of the one or more neighboring samples, wherein to determine the respective correlation values, the processing circuitry is configured to determine an Nth-order derivative between the at least one sample of the respective hypotheses of the current block and the at least one of the one or more neighboring samples;
  - determine the motion vector for the current block based on the determined respective correlation values; and
  - reconstruct the current block based on the determined motion vector.

* * * * *